United States Patent
Kato et al.

(10) Patent No.: US 12,510,694 B2
(45) Date of Patent: Dec. 30, 2025

(54) ROD LENS ARRAY, OPTICAL DEVICE, IMAGE SENSOR, PRINTER, INSPECTION APPARATUS, BASE GLASS COMPOSITION FOR GRADIENT-INDEX ROD LENS, AND METHOD OF MANUFACTURING GRADIENT-INDEX ROD LENS

(71) Applicant: Nippon Sheet Glass Company, Limited, Tokyo (JP)

(72) Inventors: Hiroaki Kato, Kanagawa (JP); Satoshi Taniguchi, Tokyo (JP); Tokushi Kaneko, Kanagawa (JP); Tsuyoshi Yamane, Kanagawa (JP); Kenichi Sato, Kanagawa (JP); Tomitaka Takagi, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 476 days.

(21) Appl. No.: 18/003,024

(22) PCT Filed: Jun. 14, 2021

(86) PCT No.: PCT/JP2021/022591
§ 371 (c)(1),
(2) Date: Dec. 22, 2022

(87) PCT Pub. No.: WO2021/261319
PCT Pub. Date: Dec. 30, 2021

(65) Prior Publication Data
US 2023/0258846 A1    Aug. 17, 2023

(30) Foreign Application Priority Data
Jun. 25, 2020   (JP) .................................. 2020-109817

(51) Int. Cl.
*G02B 3/00*      (2006.01)
*C03C 3/078*    (2006.01)
(Continued)

(52) U.S. Cl.
CPC ............ *G02B 3/0037* (2013.01); *C03C 3/078* (2013.01); *C03C 3/089* (2013.01); *C03C 21/002* (2013.01);
(Continued)

(58) Field of Classification Search
CPC .................................................... G02B 3/0087
See application file for complete search history.

(56) References Cited

U.S. PATENT DOCUMENTS 3,827,785 A    8/1974    Matsushita et al.
5,959,783 A    9/1999    Kittaka et al.
(Continued)

FOREIGN PATENT DOCUMENTS

JP    S5121594 B    7/1976
JP    10727709 A    1/1995
(Continued)

OTHER PUBLICATIONS

Extended European Search Report issued for European Patent Application No. 21829495.7, dated May 10, 2024, 9 pages.
(Continued)

*Primary Examiner* — Joseph P Martinez
(74) *Attorney, Agent, or Firm* — HSML.P.C.

(57) ABSTRACT

A rod lens array 10a includes a plurality of gradient-index rod lenses 1b arrayed to have optical axes parallel to each other, and forms an erecting equal-magnification image. The gradient-index rod lenses 1b each have a refractive-index distribution in a radial direction thereof. The refractive-index distribution $n(r)$ is approximated by $n(r)=n_0 \cdot \{1-(A/2) \cdot r^2\}$, where a refractive index at a center of the gradient-
(Continued)

index rod lens $1b$ is represented by $n_0$, a refractive-index distribution constant of the gradient-index rod lens $1b$ is represented by $\sqrt{A}$, and a distance from the center of the gradient-index rod lens $1b$ is represented by $r$. The gradient-index rod lens $1b$ has an aperture angle $\theta$ of 3 to 6°, the aperture angle $\theta$ represented by $\theta=\sin^{-1}(n_0\sqrt{A}\cdot r_0)$, where a radius of the gradient-index rod lens is represented by $r_0$. The rod lens array $10a$ has an imaging distance of 45 to 75 mm and a depth of field of 1.5 to 3.0 mm with value of modulation transfer function (MTF) of 30% or more at a spatial frequency of 6 lp/mm.

14 Claims, 16 Drawing Sheets

(51) Int. Cl.
  *C03C 3/089* (2006.01)
  *C03C 21/00* (2006.01)
  *G02B 3/06* (2006.01)
  *G03G 15/04* (2006.01)
  *G06T 7/00* (2017.01)
  *H04N 1/028* (2006.01)
  *H04N 1/031* (2006.01)
  *H04N 23/56* (2023.01)
  *H04N 25/701* (2023.01)

(52) U.S. Cl.
  CPC ............ *G02B 3/06* (2013.01); *G03G 15/0409* (2013.01); *G06T 7/0004* (2013.01); *H04N 1/02845* (2013.01); *H04N 1/0313* (2013.01); *H04N 23/56* (2023.01); *H04N 25/701* (2023.01)

(56) References Cited

U.S. PATENT DOCUMENTS

| 5,978,146 A | 11/1999 | Kittaka et al. |
| 2001/0015853 A1 | 8/2001 | Kittaka |
| 2005/0231815 A1* | 10/2005 | Miyauchi ................ C03C 3/078 359/652 |
| 2008/0213495 A1 | 9/2008 | Miyauchi et al. |
| 2015/0053844 A1 | 2/2015 | Kitamura et al. |
| 2019/0052776 A1 | 2/2019 | Kawano et al. |

FOREIGN PATENT DOCUMENTS

| JP | H1114803 A | 1/1999 |
| JP | H1164605 A | 3/1999 |
| JP | 2000035519 A | 2/2000 |
| JP | 2001174606 A | 6/2001 |
| JP | 2003075906 A | 3/2003 |
| JP | 2005289775 A | 10/2005 |
| JP | 2008014714 A | 1/2008 |
| JP | 2008230956 A | 10/2008 |
| JP | 2020121922 A | 8/2020 |
| WO | 2017150512 A1 | 9/2017 |
| WO | 2020158043 A1 | 8/2020 |

OTHER PUBLICATIONS

International Search Report and Written Opinion issued for International Patent Application No. PCT/JP2021/022591, Date of mailing: Aug. 31, 2021, 19 pages including English translation of Search Report.

\* cited by examiner

ROD LENS ARRAY, OPTICAL DEVICE, IMAGE SENSOR, PRINTER, INSPECTION APPARATUS, BASE GLASS COMPOSITION FOR GRADIENT-INDEX ROD LENS, AND METHOD OF MANUFACTURING GRADIENT-INDEX ROD LENS

TECHNICAL FIELD

The present invention relates to a rod lens array, an optical device, an image sensor, a printer, an inspection apparatus, a base glass composition for a gradient-index rod lens, and a method of manufacturing a gradient-index rod lens.

BACKGROUND ART

Conventionally known are apparatuses that observe defects on the surface of an inspection object by using an imaging device, such as a charge-coupled device (CCD) image sensor or a complementary metal-oxide-semiconductor (CMOS) image sensor. For example, Patent Literature 1 describes a surface defect inspecting apparatus including a light source, an irradiation unit, a light collecting unit, and an observation unit. The observation unit consists of an imaging lens and an imaging device, such as a CCD image sensor or a CMOS image sensor.

Patent Literature 2 describes an inspection apparatus suitable for appearance inspection of photosensitive drums of electrophotographic copiers and printers. This inspection apparatus includes a camera device that photographs a photosensitive drum by a plurality of one-dimensional CCD cameras arrayed in one row.

On the other hand, contact image sensors (CISs) are also known as imaging sensors. A CIS includes a rod lens array. In the rod lens array, gradient-index rod lenses are used in general.

For example, Patent Literatures 3 to 5 each describe a gradient-index rod lens and a rod lens array in which a plurality of gradient-index rod lenses are arrayed. A gradient-index rod lens is a rod-like (bar-like) lens that has a refractive-index distribution in which the refractive index continuously decreases from the center toward the outer periphery. In the gradient-index rod lens described in Patent Literature 3, a difference Δn in refractive index between the peripheral surface and the central axis of the lens is 0.003 or more. According to Patent Literature 3, when Δn is below 0.003, the aperture angle (2θ) is included in the range below about 10°, which suggests that this is not desirable. In other words, Patent Literature 3 is considered to suggest that an aperture angle (θ) of less than 5° is not desirable.

In Patent Literature 4, a gradient-index rod lens according to an example has an aperture angle of about 10.1 to 12.9°. In Patent Literature 5, a gradient-index rod lens according to an example has an aperture angle of 10.1 to 12.0°.

CITATION LIST

Patent Literature

Patent Literature 1: JP H7-27709 A
Patent Literature 2: JP 2003-75906 A
Patent Literature 3: JP S51-21594 B
Patent Literature 4: JP 2005-289775 A
Patent Literature 5: JP 2008-230956 A

SUMMARY OF INVENTION

Technical Problem

Patent Literatures 1 and 2 fail to describe the use of a gradient-index rod lens. The gradient-index rod lenses described in Patent Literatures 3 to 5 each have a large aperture angle. This is far from advantageous from the viewpoint of achieving a large depth of field in the gradient-index rod lens, and the gradient-index rod lenses described in Patent Literatures 3 to 5 are each considered to have a small depth of field.

In view of such circumstances, the present invention provides a rod lens array having a large depth of field. Further, the present invention provides an optical device, an image sensor, a printer, and an inspection apparatus, each of which includes such a rod lens array. In addition, the present invention provides a base glass composition for a gradient-index rod lens that is advantageous for increasing the depth of field of a rod lens array. Moreover, the present invention provides an advantageous method for manufacturing a gradient-index rod lens having a large depth of field.

Solution to Problem

The present invention provides a rod lens array forming an erecting equal-magnification image, the rod lens array comprising:
  a plurality of gradient-index rod lenses arrayed to have optical axes parallel to each other,
  the plurality of gradient-index rod lenses each having a refractive-index distribution in a radial direction thereof, the refractive-index distribution $n(r)$ approximated by $n(r)=n_0 \cdot \{1-(A/2) \cdot r^2\}$, where a refractive index at a center of the gradient-index rod lens is represented by $n_0$, a refractive-index distribution constant of the gradient-index rod lens is represented by $\sqrt{A}$, and a distance from the center of the gradient-index rod lens is represented by r,
  the plurality of gradient-index rod lenses each having an aperture angle θ of 3 to 6°, the aperture angle θ represented by $\theta=\sin^{-1}(n_0 \cdot \sqrt{A} \cdot r_0)$, where a radius of the gradient-index rod lens is represented by $r_0$,
  the rod lens array having an imaging distance of 45 to 75 mm and a depth of field of 1.5 to 3.0 mm with value of modulation transfer function (MTF) of 30% or more at a spatial frequency of 6 lp/mm.

The present invention provides an optical device including the above rod lens array.

The present invention provides an image sensor including:
  the above rod lens array;
  a linear illuminator configured to linearly illuminate an object; and
  a linear optical sensor disposed such that light reflected from the object is collected through the rod lens array.

The present invention provides a printer including a write head having the above rod lens array.

The present invention provides an inspection apparatus including:
  a conveyor for conveying an article;
  an illuminator for illuminating the article;
  an image sensor; and
  a controller, wherein
  the image sensor includes the above rod lens array for collecting light reflected from the article,
  the image sensor acquires image information of the article conveyed by the conveyor, and transmits the image information to the controller, and
  on the basis of the image information, the controller is capable of specifying a defect of the article to determine whether the article is defective.

The present invention provides a base glass composition for a gradient-index rod lens including, in mol %:

40% ≤ $SiO_2$ ≤ 65%;
0% ≤ $TiO_2$ ≤ 10%;
0.1% ≤ $MgO$ ≤ 22%;
0.15% ≤ $ZnO$ ≤ 15%;
0.5% ≤ $Li_2O$ < 4%;
2% ≤ $Na_2O$ ≤ 20%;
0% ≤ $B_2O_3$ ≤ 20%;
0% ≤ $Al_2O_3$ ≤ 10%;
0% ≤ $K_2O$ ≤ 3%;
0% ≤ $Cs_2O$ ≤ 3%;
0% ≤ $Y_2O_3$ ≤ 5%;
0% ≤ $ZrO_2$ ≤ 2%;
0% ≤ $Nb_2O_5$ ≤ 5%;
0% ≤ $In_2O_3$ ≤ 5%;
0% ≤ $La_2O_3$ ≤ 5%; and
0% ≤ $Ta_2O_5$ ≤ 5%, wherein the base glass composition further includes at least two selected from the group consisting of CaO, SrO, and BaO each in a range of 0.1 mol % or more and 15 mol % or less, and the base glass composition satisfies the following requirements, in mol %:

2% ≤ MgO+ZnO;
0.07 ≤ ZnO/(MgO+ZnO) ≤ 0.93;
2.5% ≤ $Li_2O$+$Na_2O$ < 24%; and
0% $Y_2O_3$+$ZrO_2$+$Nb_2O_5$+$In_2O_3$+$La_2O_3$+$Ta_2O_5$ ≤ 11%.

The present invention provides a method of manufacturing a gradient-index rod lens including:

forming a glass rod consisting of a glass composition including an oxide of a first alkali metal element; and forming a refractive-index distribution in the glass rod by immersing the glass rod in a molten salt including a second alkali metal element that is different from the first alkali metal element and ion-exchanging the first alkali metal element included in the glass rod for the second alkali metal element included in the molten salt, wherein the glass composition includes, in mol %:

40% ≤ $SiO_2$ ≤ 65%;
0% ≤ $TiO_2$ ≤ 10%;
0.1% ≤ $MgO$ ≤ 22%;
0.15% ≤ $ZnO$ ≤ 15%;
0.5% ≤ $Li_2O$ < 4%;
2% ≤ $Na_2O$ ≤ 20%;
0% ≤ $B_2O_3$ ≤ 20%;
0% ≤ $Al_2O_3$ ≤ 10%;
0% ≤ $K_2O$ 3%;
0% ≤ $Cs_2O$ ≤ 3%;
0% ≤ $Y_2O_3$ ≤ 5%;
0% ≤ $ZrO_2$ ≤ 2%;
0% ≤ $Nb_2O_5$ ≤ 5%;
0% ≤ $In_2O_3$ ≤ 5%;
0% ≤ $La_2O_3$ ≤ 5%; and
0% ≤ $Ta_2O_5$ ≤ 5%, the glass composition further includes at least two selected from the group consisting of CaO, SrO, and BaO each in a range of 0.1 mol % or more and 15 mol % or less, and the glass composition satisfies the following requirements, in mol %:

2% ≤ MgO+ZnO;
0.07 ZnO/(MgO+ZnO) ≤ 0.93;
2.5% $Li_2O$+$Na_2O$ < 24%; and
0% ≤ $Y_2O_3$+$ZrO_2$+$Nb_2O_5$+$In_2O_3$+$La_2O_3$+$Ta_2O_5$ ≤ 11%.

Advantageous Effects of Invention

The above rod lens array has a large depth of field. Further, the above base glass composition for a gradient-index rod lens is advantageous for increasing the depth of field of the rod lens array.

DESCRIPTION OF EMBODIMENTS

Figure 1:
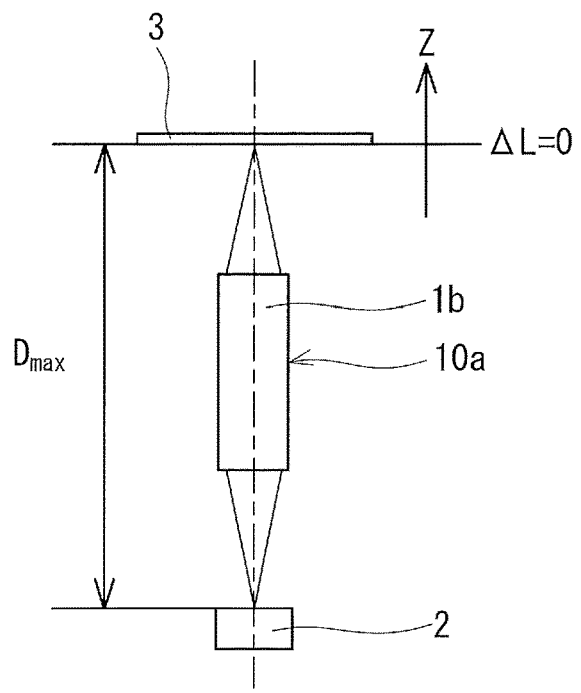
FIG. 1 is a diagram describing a method of measuring the depth of field of an example of a gradient-index rod lens according to the present invention.

Image data to be collected in appearance inspection of an inspection object needs to have a resolution at which a defect of the inspection object can be identified. When a camera including a one-dimensional CCD sensor is used to obtain image data with a high resolution, the effective width in which image capturing can be performed by one camera is small. Accordingly, it is sometimes difficult to capture an image of the entire inspection object by one camera. For example, when a pixel size corresponding to the resolution required in image data is 90 μm, a width of a region in which image capturing can be performed by a camera including a one-dimensional CCD sensor of 4096 pixels is about 370 mm. In this case, to thoroughly inspect an inspection object having a width of 1200 mm, four camera systems need to be arranged in the width direction, each of which include a one-dimensional CCD sensor and a camera lens. Installation of a plurality of camera systems including one-dimensional CCD sensors increases the manufacturing cost of the apparatus. In addition, each time the type of the inspection object is changed, such a plurality of camera systems need adjustment and maintenance, thus increasing the running cost for inspection as well.

In view of this, it is conceivable to use a CIS to perform appearance inspection of an inspection object. The CIS includes a plurality of one-dimensional photodetectors disposed on a substrate and a rod lens array. In the CIS, the rod lens array forms an erecting equal-magnification image. With the CIS, a one-dimensional image having a width of 1200 mm can be obtained by a single unit. The rod lens array is, for example, an array of a plurality of gradient-index rod lenses. The gradient-index rod lens is a substantially cylindrical lens having a refractive-index distribution in its radial direction, where the refractive index varies from the central portion toward the peripheral portion in the radial direction of the gradient-index rod lens. In CISs including a rod lens array, the distance between the imaging device and the object to be photographed can be reduced to about one-tenth of that in conventional camera systems including a CCD sensor and a lens, and such CISs are advantageous in device miniaturization. On the other hand, in CISs, the depth of field (DOF), which is a characteristic value indicating an acceptable range of the distance between the object to be photographed and the lens, is small. This causes a problem that the inspection object has a portion in focus and a portion out of focus when the inspection object varies in thickness. Consequently, an image of the portion out of focus is not clear, which leads to a possibility of overlooking of a defect and misidentification of a defect.

As described above, the gradient-index rod lenses described in Patent Literatures 3 to 5 each have a large aperture angle, and this is far from advantageous from the viewpoint of increasing the DOF of the gradient-index rod lens. In view of this, to achieve the DOF in a desired range in the gradient-index rod lens, the present inventors have drastically reviewed the conditions of the glass composition used for manufacturing the gradient-index rod lens. As a result of repeated much trial and error, the present inventors have finally found a gradient-index rod lens capable of achieving the DOF in a desired range. The gradient-index rod lens according to the present invention can be utilized not only in the technical field of appearance inspection of the inspection object but also throughout the technical field of image formation by image scanners, copiers, facsimiles, printers, and the like.

Embodiments of the present invention will be described below with reference to the drawings. The following description relates to an example of the present invention, and the present invention is not limited to the following embodiments.

A gradient-index rod lens 1b has an aperture angle θ of 3 to 6°. The radius of the gradient-index rod lens 1b is represented by $r_0$. The refractive index at the center of the gradient-index rod lens 1b is represented by $n_0$. A refractive-index distribution constant of the gradient-index rod lens 1b is represented by $\sqrt{A}$. A refractive index n(r) at a distance r from the center of the gradient-index rod lens can be approximated by $n(r)=n_0 \cdot \{1-(A/2) \cdot r^2\}$. In this case, the aperture angle θ is represented by $\sin^{-1}(n_0 \cdot \sqrt{A} \cdot r_0)$. In the gradient-index rod lens 1b, when an erecting equal-magnification image is formed, an imaging distance (TC), the distance from an objective to an erecting image is 45 to 75 mm. The gradient-index rod lens 1b has a depth of field (DOF) of 1.5 to 3.0 mm. The DOF of the gradient-index rod lens 1b is determined by subtracting the minimum value of the working distance from the maximum value of the working distance. For the working distance of the gradient-index rod lens 1b, the value of the modulation transfer function (MTF) at a spatial frequency of 6 lp/mm is 30% or more.

As shown in FIG. 1, the DOF of the gradient-index rod lens 1b can be determined by, for example, arranging a rod lens array 10a, a line pattern 3, and a photodetector 2 at a predetermined interval in the optical axis direction and obtaining the value of the MTF while varying the distance between the rod lens array 10a and the line pattern 3. The rod lens array 10a is configured by arraying a plurality of gradient-index rod lenses 1b in a direction perpendicular to the optical axis. The line pattern 3 has black and white line pairs corresponding to a spatial frequency of 6 lp/mm. The photodetector 2 is, for example, a CCD sensor. For example, light emitted from a halogen lamp is caused to pass through a color filter and a light diffusing plate, and then the line pattern 3 is irradiated with the light. The color filter may transmit, for example, light having a wavelength in the range of 500 to 600 nm, or may transmit mainly light having a wavelength of 530 nm. At this time, the value of the MTF can be determined as the reproduction ratio of an image (output image) obtained by imaging on the photodetector 2 by the rod lens array 10a with respect to an image (input image) of the line pattern 3 having a predetermined spatial frequency composed of bright portions and dark portions before entering the rod lens array 10a.

A distance $D_{max}$ between the line pattern 3 and the photodetector 2 for which the value of the MTF is maximum (object point-imaging point distance) is determined. For $D_{max}$, an erecting equal-magnification image is obtained by the rod lens array 10a. Then, while the distance between the rod lens array 10a and the photodetector 2 is fixed to be constant, the line pattern 3 is moved in the positive direction (ΔL>0) and the negative direction (ΔL<0) of the Z-axis parallel to the optical axis to obtain the values of the MTF at the respective positions. Thus, a predetermined acceptable range for the value of the MTF is set, so that the maximum value and the minimum value of the working distance can be obtained. As a result, the DOF of the gradient-index rod lens 1b can be determined. When ΔL>0 is satisfied, the distance between the line pattern 3 and the rod lens array 10a is larger than the working distance corresponding to the distance $D_{max}$. In contrast, when ΔL<0 is satisfied, the distance between the line pattern 3 and the rod lens array 10a is smaller than the working distance corresponding to the distance $D_{max}$. When ΔL=0 is satisfied, the distance between the line pattern 3 and the rod lens array 10a is equal to the working distance corresponding to the distance $D_{max}$.

The gradient-index rod lens 1b and the rod lens array 10a have DOFs within the above range, and are accordingly advantageous for, for example, acquiring image data suitable for appearance inspection of an inspection object having a non-uniform thickness, a step, and unevenness. Accordingly, the gradient-index rod lens 1b and the rod lens array 10a can contribute to enhancement in accuracy of appearance inspection of the inspection object and to sophistication of the inspection standard.

The DOF of the gradient-index rod lens 1b is desirably 1.5 mm or more, more desirably 1.8 mm or more, and still more desirably 2 mm or more. The DOF of the gradient-index rod lens 1b is desirably 2.8 mm or less, and more desirably 2.5 mm or less.

When forming an erecting equal-magnification image, the gradient-index rod lens 1b has the maximum value of the MTF at a lens-imaging position distance $L_i$ that is not limited to any specific value. The lens-imaging position distance $L_i$ is, for example, 13 to 28 mm. In this case, when a rod lens array including the gradient-index rod lenses 1b is incorporated into an inspection apparatus, an appropriate distance between an object to be inspected and the rod lens array is easily maintained. Accordingly, it is possible to facilitate assembly of components such as an optical system. In addition, the gradient-index rod lens 1b has a desired DOF and is advantageous from the viewpoint of inspecting an object having a step within a predetermined range.

The lens-imaging position distance Li is desirably 15 mm or more, and more desirably 18 mm or more. The lens-imaging position distance Li is desirably 25 mm or less, and more desirably 22 mm or less.

Figure 2:
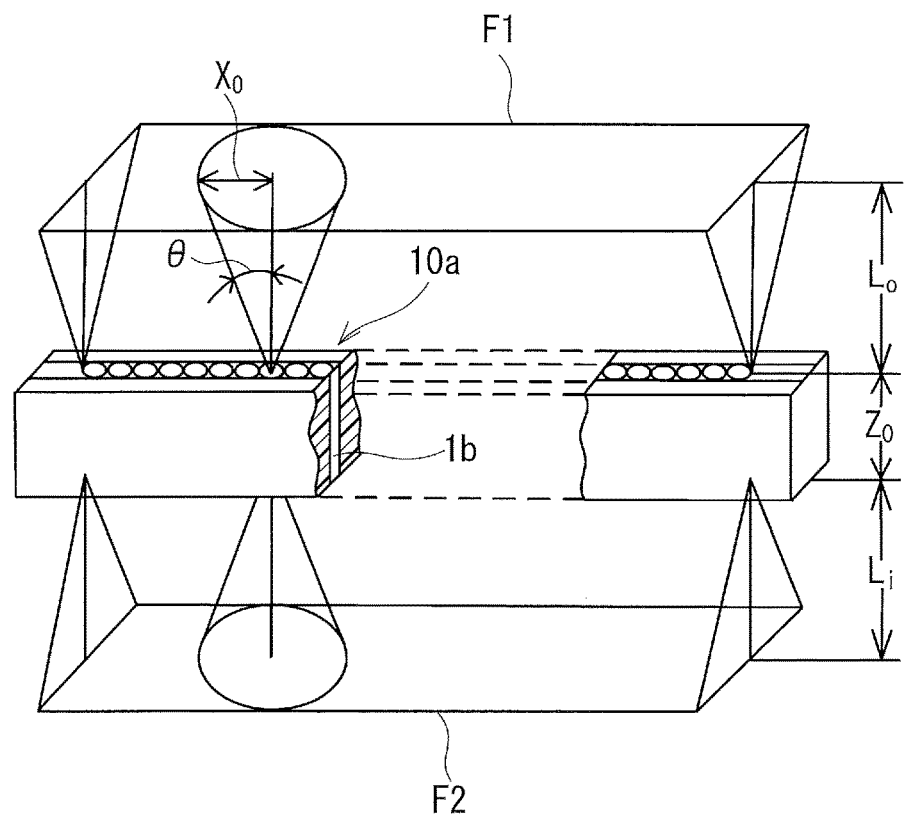
FIG. 2 is a diagram showing the aperture angle of the example of the gradient-index rod lens according to the present invention.

Owing to the gradient-index rod lens 1b having an aperture angle θ of 3 to 6°, the DOF of the gradient-index rod lens 1b is easily adjusted to a desired range. The aperture angle θ of the gradient-index rod lens 1b is defined, for example, as shown in FIG. 2. The aperture angle θ is the maximum value of an angle formed by a beam capable of entering one end of the optical axis of the gradient-index rod lens 1b and the optical axis. In FIG. 2, the sign F1 represents a subject plane (object plane), and the sign F2 represents a light receiving plane (image plane) in a photodetector or the like. The sign $Z_0$ represents the length of the gradient-index rod lens 1b. The sign $L_0$ represents the distance between the subject plane F1 and the gradient-index rod lens 1b for which the value of the MTF is maximum. The sign $L_i$ represents the distance between the image plane F2 and the gradient-index rod lens 1b for which the value of the MTF is maximum. In FIG. 2, the rod lens array 10a constitutes an imaging system of substantial erecting equal-magnification images, and the distance $L_i$ is substantially equal to the distance $L_0$. In FIG. 2, the sign $X_0$ represents the radius of the field of view of the gradient-index rod lens 1b. The aperture angle θ of the gradient-index rod lens 1b can be determined, for example, according to a method described in the examples. In the method described in the examples, the aperture angle θ may be determined by using the refractive index $n_0$ at the center of the gradient-index rod lens 1b instead of the refractive index Nc of a glass rod before ion exchange. The refractive index Nc or $n_0$ can be determined by the V-block method described in Japanese Industrial Standards (JIS) B 7071-2: 2018.

The aperture angle θ of the gradient-index rod lens 1b may be 3.5° or more or 3.7° or more. The aperture angle θ of the gradient-index rod lens 1b is desirably 5.5° or less, and more desirably 5.2° or less.

The maximum value of the MTF of the rod lens array 10a is not limited to any specific value, and is, for example, 60% or more, desirably 65% or more, and more desirably 70% or more.

Figure 3A:
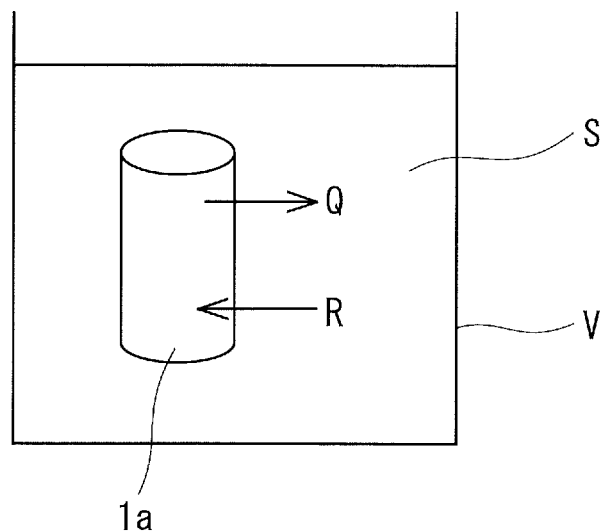
FIG. 3A is a diagram showing an ion exchange process in an example of a method of manufacturing the gradient-index rod lens according to the present invention.
Figure 3B:
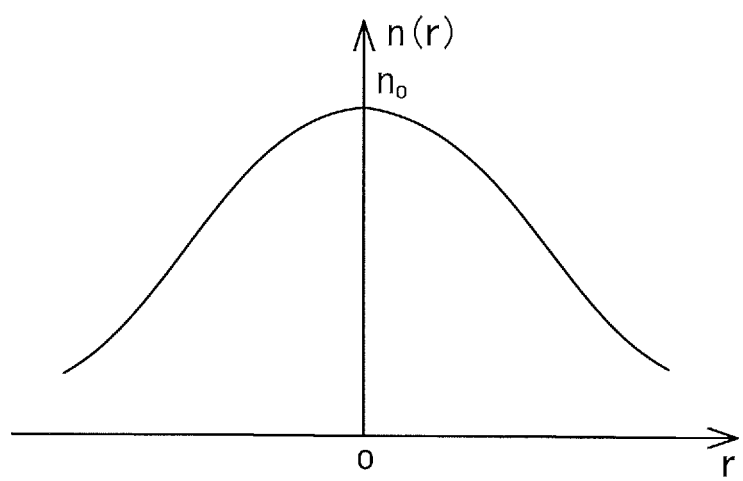
FIG. 3B is a graph conceptually showing a refractive-index distribution of a gradient-index rod lens.

The gradient-index rod lens 1b has, for example, a refractive-index distribution in the radial direction as shown in FIG. 3B. Here, the refractive index $n_0$ at the origin in FIG. 3B means the refractive index on the central axis of the gradient-index rod lens 1b. The sign r represents the position of the gradient-index rod lens 1b in the radial direction.

The refractive-index distribution of the gradient-index rod lens 1b is represented by, for example, Equation (1) below. In Equation (1), r represents the distance from the optical axis of the gradient-index rod lens 1b, n(r) represents the refractive index of the gradient-index rod lens 1b at the distance r, $n_0$ represents the refractive index at the center of the gradient-index rod lens 1b, and √A, $h_4$, $h_6$, and $h_8$ each represent a refractive-index distribution coefficient.

$$n(r)^2 = n_0 \cdot \{1 - (\sqrt{A} \cdot r)^2 + h_4 \cdot (\sqrt{A} \cdot r)^4 + h_6 \cdot (\sqrt{A} \cdot r)^6 + h_8 \cdot (\sqrt{A} \cdot r)^8\} \quad \text{Equation (1)}$$

Further, the refractive-index distribution of the gradient-index rod lens 1b can be approximated by Equation (2).

$$n(r) = n_0 \cdot \{1 - (A/2) \cdot r^2\} \quad \text{Equation (2)}$$

The refractive index $n_0$ at the center of the gradient-index rod lens 1b is not limited to any specific value, and is, for example, 1.51 to 1.65. This easily increases the DOF, and formation of the refractive-index distribution by ion exchange of base glass is not so difficult. The refractive index no at the center of the gradient-index rod lens 1b is desirably 1.54 to 1.62.

The refractive-index distribution constant (√A) of the gradient-index rod lens 1b is not limited to any specific value. The sign √A means the square root of A. The refractive-index distribution constant √A of the gradient-index rod lens 1b is, for example, 0.130 to 0.230 mm$^{-1}$. In the case where the refractive-index distribution constant √A is included in such a range, the aperture angle θ of the gradient-index rod lens 1b is easily included in a desired range. As a result, the DOF of the gradient-index rod lens 1b is easily adjusted to a desired range.

The refractive-index distribution constant √A of the gradient-index rod lens 1b may be 0.140 mm$^{-1}$ or more, 0.150 mm$^{-1}$ or more, or 0.170 mm$^{-1}$ or more. The refractive-index distribution constant of the gradient-index rod lens 1b is desirably 0.210 mm$^{-1}$ or less, and more desirably 0.205 mm$^{-1}$ or less.

It is advantageous that the imaging distance (TC) of an erecting image in the gradient-index rod lens 1b is 45 to 75 mm from the viewpoint of adjusting the DOF of the gradient-index rod lens 1b to a desired range.

It is desirable that the imaging distance (TC) of the erecting image formed by the gradient-index rod lens 1b should be larger than a predetermined value from the viewpoint of adjusting the aperture angle and the DOF to desired ranges while taking into consideration the balance with a lens length $Z_0$. From this viewpoint, the imaging distance (TC) of the erecting image in the gradient-index rod lens 1b may be 47 mm or more, 50 mm or more, 53 mm or more, or 54 mm or more. The imaging distance of the erecting image formed by the gradient-index rod lens 1b may be 70 mm or less or 67 mm or less from the viewpoint of avoiding an increase in size of an optical device into which the gradient-index rod lens 1b is incorporated. In this case, when the gradient-index rod lens 1b is used in a contact image sensor including an LED or the like as the illumination light, the gradient-index rod lens 1b has a size suitable for reproducing uniform illumination having little unevenness while suppressing an excessive decrease in its intensity.

The gradient-index rod lens 1b may have, as necessary, a structure for preventing generation of noise light (so-called white noise (stray light)) caused by reflection, from the side surface of the lens, of incident light having an incident angle larger than an aperture angle. Such a structure can be, for example, a light absorbing layer or a light scattering layer, provided on the side surface of the lens. For example, the gradient-index rod lens 1b may have a core-cladding structure in which a colored layer serving as the light absorbing layer is disposed on the side surface of the lens. In the case where the gradient-index rod lens 1b has the core-cladding structure, the lens diameter of the outer shape can be different from the lens effective diameter substantially contributing to image formation. Further, the gradient-index rod lens 1b may have, on the side surface near the outermost peripheral surface thereof, a structure in which a fine asperity portion serving as the light scattering layer is formed.

The gradient-index rod lens 1b may be made of a glass lens. The glass composition at the center of the gradient-index rod lens 1b satisfies, for example, the following requirements, in mol %: 40%≤$SiO_2$≤65%; 0% $TiO_2$≤10%; 0.1%≤MgO≤22%; 0.15%≤ZnO≤15%; 0.5% $Li_2O$<4%; 2%≤$Na_2O$≤20%; 0%≤$B_2O_3$≤20%; 0%≤$Al_2O_3$≤10%; and 0%≤$K_2O$≤3%. The base glass composition for a gradient-index rod lens includes, for example, in mol %: 40%≤$SiO_2$≤65%; 0%≤$TiO_2$≤10%; 0.1%≤MgO≤22%; 0.15%≤ZnO≤15%; 0.5%≤$Li_2O$<4%; 2%≤$Na_2O$≤20%; 0%≤$B_2O_3$≤20%; 0%≤$Al_2O_3$≤10%; 0%≤$K_2O$≤3%; 0%≤$Cs_2O$≤3%; 0%≤$Y_2O_3$≤5%; 0%≤$ZrO_2$≤2%; 0% $Nb_2O_5$≤5%; 0%≤$In_2O_3$≤5%; 0% $La_2O_3$≤5%; and 0% $Ta_2O_5$≤5%. In addition, this base glass composition includes at least two selected from the group consisting of CaO, SrO, and BaO each in a range of 0.1 mol % or more and 15 mol % or less. Further, this base glass composition satisfies the following requirements, in mol %: 2%≤MgO+ZnO; 0.07 ZnO/(MgO+ZnO)≤0.93; 2.5%≤$Li_2O$+$Na_2O$<24%; and 0%≤$Y_2O_3$+$ZrO_2$+$Nb_2O_5$+$In_2O_3$+$La_2O_3$+$Ta_2O_5$≤11%. By using such a base glass composition, it is possible to achieve a gradient-index rod lens having a desired DOF.

The gradient-index rod lens 1b can be manufactured, for example, by performing an ion exchange process on a glass rod consisting of the above glass composition.

($SiO_2$)

$SiO_2$ is an essential component that forms the network structure of glass. The $SiO_2$ content of less than 40 mol % relatively increases the contents of other components necessary to allow the optical properties as a gradient-index rod lens to develop after ion exchange. In this case, thus, devitrification tends to occur. Further, this content of less than 40 mol % markedly deteriorates the chemical durability as a glass composition. On the other hand, this content exceeding 65 mol % limits the contents of other components, for example, an alkali component for forming a refractive-index distribution, a component for increasing a refractive index, and a component for adjusting the physical property value. This makes it difficult to obtain a practical glass composition. Accordingly, the $SiO_2$ content is 40 mol % or more and 65 mol % or less.

($TiO_2$)

$TiO_2$ is an essential component that acts to increase the refractive index of the glass composition. By increasing the refractive index of the base glass composition, it is possible to increase the refractive index at the center of a gradient-index rod lens obtained from the glass composition. Further, by increasing the $TiO_2$ content, it is possible to bring the refractive-index distribution of the gradient-index rod lens into a more ideal condition, thereby manufacturing a gradient-index rod lens having an excellent resolution. When the $TiO_2$ content is 10 mol %, no deterioration in image resolution based on the resulting lens is observed, whereas when this content is less than 1 mol %, the image resolution noticeably deteriorates and consequently a practical lens cannot be obtained. On the other hand, when this content exceeds 10 mol %, chromatic aberration of the resulting lens increases with increment in coloration of the lens and consequently a practical lens cannot be obtained, either. Thus, to obtain a lens in which the image resolution can be increased and the chromatic aberration is small, the $TiO_2$ content is 1 mol % or more and 10 mol % or less. The $TiO_2$ content is desirably 2 mol % or more and 8 mol % or less.

(MgO)

MgO is an essential component that acts to lower the melting temperature of the glass composition to increase the refractive index difference (Δn) between the central portion and the peripheral portion of the lens after ion exchange. When the MgO content exceeds 22 mol %, devitrification tends to occur. Further, when the MgO content exceeds 22 mol %, the contents of other components excessively decrease, and consequently a practical glass composition cannot be obtained. Accordingly, the MgO content is 0.1 mol % or more and 22 mol % or less. From the viewpoint of achieving a sufficient refractive index difference, the MgO content is desirably 2 mol % or more. When the MgO content is 2 mol % or more, the contents of alkaline-earth metal oxides (CaO, SrO, and BaO) can be controlled more appropriately for the purpose of further reducing the mobility of alkali ions. That is, the MgO content is desirably 2 mol % or more and 22 mol % or less, and more desirably 2 mol % or more and 16 mol % or less.

(ZnO, MgO+ZnO, and ZnO/(MgO+ZnO))

ZnO acts to enhance the weather resistance of the glass composition and the gradient-index rod lens. In the glass composition according to the present invention, ZnO may be added for partial substitution for MgO. From the viewpoint of increasing the weather resistance of the glass composition and the gradient-index rod lens, the ZnO content is 0.15 mol % or more and 15 mol % or less. At this time, the contents of MgO and ZnO are adjusted such that the sum of the contents of MgO and ZnO (MgO+ZnO) is 2 mol % or more. In addition, the contents of MgO and ZnO are adjusted such that the ratio of the ZnO content to the sum of the contents of MgO and ZnO (ZnO/(MgO+ZnO)) is 0.07 ZnO/(MgO+ZnO)≤0.93. From the viewpoint of further increasing the weather resistance of the glass composition and the gradient-index rod lens, the ZnO content is desirably 3 mol % or more and 15 mol % or less. In this case, MgO+ZnO may be 6 mol % or more, and a requirement 0.12 ZnO/(MgO+ZnO)≤0.93 can be satisfied. From the viewpoint of the devitrification resistance, the ZnO content is desirably 8 mol % or less. From the viewpoint of even further increasing the weather resistance of the glass composition and the gradient-index rod lens, the ZnO content is more desirably 4 mol % or more and 15 mol % or less. In this case, MgO+ZnO may be 6 mol % or more, and MgO+ZnO can be 6 mol % or more and 22 mol % or less. MgO+ZnO may be 15 mol % or less. Further, ZnO/(MgO+ZnO) is desirably 0.07 or more and 0.9 or less, more desirably 0.25 or more and 0.85 or less, still more desirably 0.25 or more and 0.8 or less, and particularly desirably 0.3 or more and 0.8 or less.

($Li_2O$)

$Li_2O$ is an essential component, and is one of the most important components for obtaining a gradient-index rod lens through ion exchange of the glass composition of the present invention. It has been conventionally considered that a low $Li_2O$ content in the glass composition does not allow a sufficient concentration distribution, that is, a sufficient refractive-index distribution, to develop through ion exchange and consequently a suitable gradient-index rod lens cannot be achieved. However, the present inventors have newly found that, even with a glass composition having a $Li_2O$ content of 4 mol % or less, a gradient-index rod lens having a suitable refractive-index distribution and a large DOF can be produced by performing ion exchange under predetermined conditions. When the $Li_2O$ content exceeds 4 mol %, the resulting gradient-index rod lens tends to have an increased aperture angle and thus a decreased DOF. The $Li_2O$ content is 0.5 mol % or more, desirably 0.7 mol % or more, and more desirably 1 mol % or more. Further, the $Li_2O$ content is 4 mol % or less, desirably 3.5 mol % or less, more desirably 3 mol % or less, and still more desirably 2 mol % or less.

One of the features of the gradient-index rod lens $1b$ lies in having a lower $Li_2O$ content than various prior arts. There have been conventionally manufacturing process-related reasons for impossibility in reduction of the $Li_2O$ content. The present inventors have newly found that, by performing new improvements such as limitation of the throughput of glass rods per batch in the ion exchange method and reduction of the initial content of Li in the molten salt, a gradient-index rod lens can be obtained in which an aperture angle smaller than before and a practical resolution are achieved while a lens aberration such as a field curvature is suppressed.

($Na_2O$)

In ion exchange, owing to a so-called mixed alkali effect, $Na_2O$ promotes ion exchange between Li and an ion of ion exchange species to be substituted for a Li ion (ion contained in a molten salt) and maintains an adequate ion mobility. By maintaining an adequate ion mobility, it is possible to adjust the ion exchange rate properly, thereby adjusting the optical properties of the gradient-index rod lens. When the $Na_2O$ content in the glass composition is less than 2 mol %, the glass hardens while being molded, which makes the molding difficult. In addition, the melting temperature of the glass is raised markedly, which makes lens production difficult. Further, it is difficult to sufficiently achieve the effect of maintaining an adequate ion mobility. On the other hand, when the $Na_2O$ content exceeds 20%, the chemical durability of the glass deteriorates, resulting in a lack of practicality. Accordingly, the $Na_2O$ content is 2 mol % or more, desirably 5 mol % or more, and more desirably 10 mol % or more. Further, the $Na_2O$ content is 20 mol % or less, and desirably 17 mol % or less.

($Li_2O+Na_2O$)

As described above, the sum of the $Li_2O$ content and the $Na_2O$ content ($Li_2O+Na_2O$) in the glass composition is 2.5 mol % or more and less than 24 mol %. Owing to $Li_2O+Na_2O$ within this range, an image having a favorable resolution can be obtained by a gradient-index rod lens manufactured using this glass composition. $Li_2O+Na_2O$ is desirably 6 mol % or more, and more desirably 10 mol % or more.

($Li_2O/Na_2O$)

When the ratio of the $Li_2O$ content to the $Na_2O$ content ($Li_2O/Na_2O$) is large, the gradient-index rod lens manufactured using the glass composition has an enhanced resolving power in some cases. On the other hand, when the $Li_2O/Na_2O$ is excessively large (e.g., 1.0 or more), the gradient-index rod lens manufactured using the glass composition tends to have an increased aperture angle and a reduced DOF. Accordingly, $Li_2O/Na_2O$ is, for example, 0.2 or less, desirably 0.15 or less, and more desirably 0.1 or less.

The above glass composition may further include the following components.

($B_2O_3$)

$B_2O_3$ is an optional component that forms the network structure of glass, and acts to promote vitrification of the glass composition and adjust the viscosity thereof while hardly changing the resolving power and the aperture angle θ of the resulting gradient-index rod lens. In addition, $B_2O_3$ also acts to lower the ion exchange rate of the glass composition, though the extent of which is small. $B_2O_3$ may be added in a case, for example, where although the respective contents of the essential components described above are included in the ranges specified in the present invention, the content of a portion of the components becomes relatively large as a composition and the glass stability is deteriorated (e.g., devitrification tends to occur). By adding $B_2O_3$, it is possible to reduce the content of the above portion of the components that has become relatively large without changing the proportions among the contents of the essential components. The $B_2O_3$ content that can be added without changing the resolving power and the aperture angle of the resulting gradient-index rod lens is, for example, 20 mol % or less. Accordingly, the $B_2O_3$ content is 0 mol % or more and 20 mol % or less. This content is desirably 0 mol % or more and 10 mol % or less. In the case where the glass composition contains $B_2O_3$, its content is desirably 1 mol % or more and 10 mol % or less.

($Al_2O_3$)

The base glass composition for a gradient-index rod lens may contain, as an optional component, $Al_2O_3$ whose content is 0 mol % or more and 10 mol % or less.

($SiO_2+TiO_2+B_2O_3$)

The sum of the contents of $SiO_2$, $TiO_2$, and $B_2O_3$ ($SiO_2+TiO_2+B_2O_3$) in the base glass composition for a gradient-index rod lens is, for example, 41 mol % or more and 70 mol % or less, and desirably 50 mol % or more and 70 mol % or less.

($Y_2O_3$, $ZrO_2$, $Nb_2O_5$, $In_2O_3$, $La_2O_3$, and $Ta_2O_5$)

The base glass composition for a gradient-index rod lens may contain at least one component selected from the group consisting of $Y_2O_3$, $ZrO_2$, $Nb_2O_5$, $In_2O_3$, $La_2O_3$, and $Ta_2O_5$ for the purpose of adjusting the refractive index or enhancing the weather resistance of a gradient-index rod lens resulting from ion exchange. The sum of the contents of these components is 0 mol % or more and 11 mol % or less. In the case where the base glass composition for a gradient-index rod lens contains these components, the sum of the contents of these components is desirably 0.2 mol % or more and 6 mol % or less. Further, the sum of the contents of these components and the ZnO content is desirably 15 mol % or less.

($Y_2O_3$)

The $Y_2O_3$ content is desirably 0 mol % or more and 5 mol % or less.

($ZrO_2$)

The $ZrO_2$ content is desirably 0 mol % or more and 2 mol % or less. In the case where the base glass composition for a gradient-index rod lens contains $ZrO_2$, its content is 0.2 mol % or more and 2 mol % or less.

The respective contents of $Nb_2O_5$, $In_2O_3$, $La_2O_3$, and $Ta_2O_5$ are each desirably 0 mol % or more and 5 mol % or less.

($K_2O$ and $Cs_2O$)

As with MgO, CaO, SrO, and BaO, $K_2O$ and $Cs_2O$ are optional components that act to reduce the mobility of alkali ions by the mixed alkali effect. The respective contents of $K_2O$ and $Cs_2O$ are each, for example, 0 mol % or more and 3 mol % or less. From the viewpoint of increasing the water resistance of the base glass composition for a gradient-index rod lens, the $Cs_2O$ content is desirably less than 2 mol %, more desirably 0 mol % or more and 1 mol % or less, and still more desirably 0.5 mol % or less. From the viewpoint of increasing the water resistance of the base glass composition for a gradient-index rod lens, it is desirable that the base glass composition for a gradient-index rod lens should be substantially free of $Cs_2O$. The term "substantially free" as used herein means that the content of the component referred to is less than 0.1 mol %.

(Additional Component)

The base glass composition for a gradient-index rod lens may contain $GeO_2$ as an additional component. The $GeO_2$ content can be 0 mol % or more and 10 mol % or less. Further, the base glass composition for a gradient-index rod lens may contain, as an additive, at least one selected from the group consisting of $SnO_2$, $As_2O_3$, and $Sb_2O_3$. The respective contents of $SnO_2$, $As_2O_3$, and $Sb_2O_3$ each can be 0 mol % or more and 1 mol % or less. The base glass composition for a gradient-index rod lens may consist substantially of the above components. In this case, the respective contents of the components contained in the glass composition and the relation among the respective contents of the components (the sum and the content ratio) satisfy the above requirements. The phrase "consist substantially of" as used herein means to allow for the content of impurities of less than 0.1 mol %.

(PbO)

The base glass composition for a gradient-index rod lens is substantially free of lead (PbO as a typical compound). Further, the gradient-index rod lens 1b is also substantially free of lead.

The base glass composition for a gradient-index rod lens has, for example, a water resistance of Class 1 determined in accordance with Japan Optical Glass Industrial Standards (JOGIS) 06-2009. In this case, the base glass composition for a gradient-index rod lens has a high water resistance, and a gradient-index rod lens manufactured using the base glass composition for a gradient-index rod lens also tends to have a high water resistance. Glass forming the gradient-index rod lens may also have a water resistance of Class 1 determined in accordance with JOGIS 06-2009.

The base glass composition for a gradient-index rod lens contains an oxide of a first alkali metal element. The gradient-index rod lens 1b can be manufactured, for example, by a method including the following steps (I) and (II):

(I) forming a glass rod 1a consisting of the above base glass composition for a gradient-index rod lens; and (II) forming a refractive-index distribution in the glass rod 1a by immersing the glass rod 1a in a molten salt S including a second alkali metal element R that is different from a first alkali metal element Q included in the base glass composition for a gradient-index rod lens and ion-exchanging the first alkali metal element Q included in glass rod 1a for the second alkali metal element R included in the molten salt.

In the step (II), for example, as shown in FIG. 3A, the glass rod 1a is charged into the molten salt S inside a container V such that the glass rod 1a is immersed in the molten salt S for a predetermined time. In the molten salt S, for example, at least one of potassium nitrate and sodium nitrate is melted. Immersing the glass rod 1a in the molten salt S, for example, causes dissolution of cations of the first alkali metal element Q such as Li (lithium) contained in the glass rod 1a into the molten salt S. On the other hand, cations of the second alkali metal element R such as K (potassium) contained in the molten salt S enter the glass rod 1a. By adjusting the temperature of the molten salt S and the immersion time of the glass rod 1a in the molten salt S, it is possible to appropriately control the ion exchange between the cations of the first alkali metal element Q and the cations of the second alkali metal element R. Inside the glass rod 1a, a concentration distribution of specific monovalent cations is generated, and a refractive-index distribution as shown in FIG. 3B is formed in the glass rod 1a according to the concentration distribution. Thus, the gradient-index rod lens 1b can be manufactured from the glass rod 1a.

As shown in FIG. 3B, the gradient-index rod lens 1b typically has the highest refractive index in the central portion. In the central portion of the gradient-index rod lens 1b, r=0 is satisfied. The refractive index no in the central portion of the gradient-index rod lens 1b may be equal to the refractive index Nc of the base glass composition for a gradient-index rod lens before an ion exchange process. At this time, cations such as alkali metal elements do not substantially migrate in the glass rod 1a, and accordingly the composition of the glass in the central portion of the gradient-index rod lens can be the same as the composition of the base glass before the ion exchange.

An optical product according to the present invention is not limited to any specific product as long as the optical product includes the gradient-index rod lens 1b. The gradient-index rod lens 1b can be used to provide, for example, a predetermined rod lens array. The rod lens array forms an erecting equal-magnification image. The rod lens array in this case can have, as the array of the gradient-index rod lenses 1b, a zero-dimensional array, a one-dimensional array, or a two-dimensional array. The zero-dimensional array is, for example, a configuration in which a single gradient-index rod lens 1b is disposed, and is expected to exert a desired action by an optical product including a single gradient-index rod lens 1b. The one-dimensional array is a configuration in which the plurality of gradient-index rod lenses 1b are arrayed in one row in a specific direction. The specific direction is referred to as a main-scanning direction, and a direction that is perpendicular to the main-scanning direction and perpendicular to the optical axis is referred to as a sub-scanning direction. In the rod lens array, the plurality of gradient-index rod lenses 1b are arrayed to have optical axes substantially parallel to each other. The two-dimensional array is a configuration in which the lenses are arrayed in a one-dimensional array and further arrayed in a direction different from that of the one-dimensional array. The two-dimensional array can be, for example, a configuration in which the plurality of gradient-index rod lenses 1b are arrayed in two or more rows along the main-scanning direction. According to a rod lens array 10b, it is possible to obtain a wide-range erecting equal-magnification image by using the gradient-index rod lenses each having even a small diameter. As described above, the imaging distance (TC) in the gradient-index rod lens 1b is 45 to 75 mm. In other words, the rod lens array has an imaging distance of 45 to 75 mm. In addition, the gradient-index rod lens 1b has a depth of field (DOF) of 1.5 to 3.0 mm. In other words, the depth of field (DOF) in the rod lens array is 1.5 to 3.0 mm.

Figure 4:
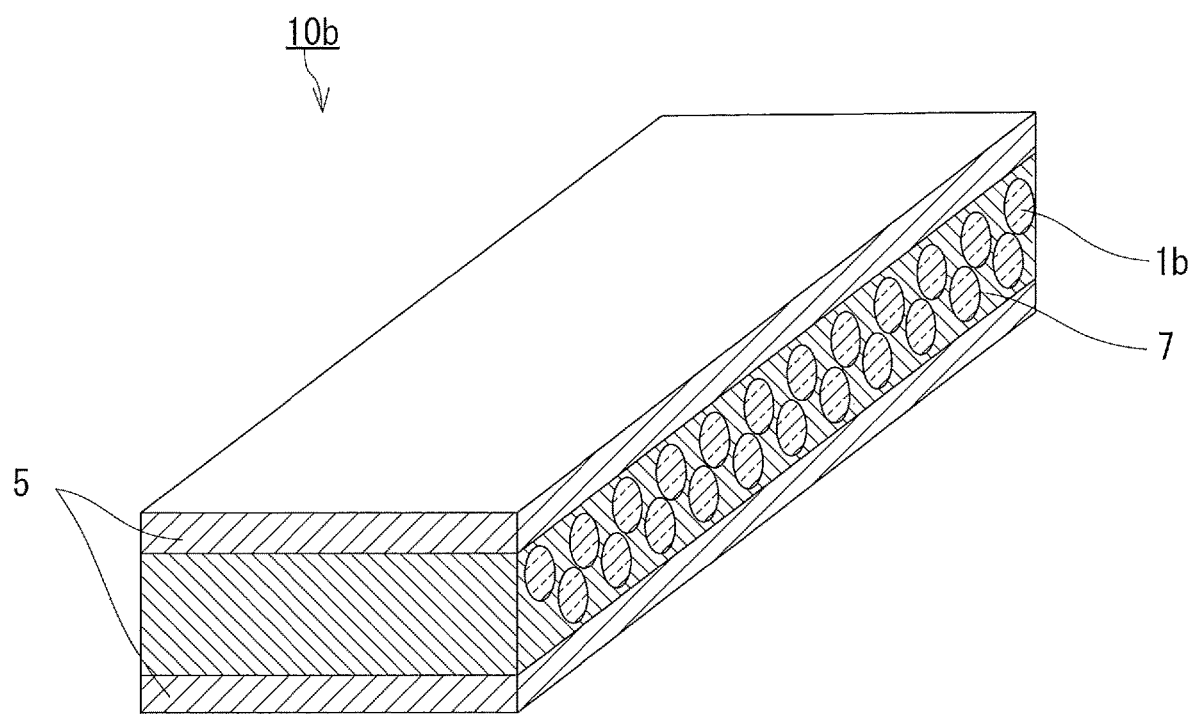
FIG. 4 is a perspective view showing an example of a rod lens array according to the present invention.

The gradient-index rod lens 1b can be used to provide, for example, the rod lens array 10b shown in FIG. 4. In the rod lens array 10b, the plurality of gradient-index rod lenses 1b are arrayed to have optical axes substantially parallel to each other. In the rod lens array 10b, the plurality of gradient-index rod lenses 1b are arrayed in two rows to form a two-dimensional array. In the rod lens array 10b, the plurality of gradient-index rod lenses 1b are arrayed, for example, between a pair of fiber-reinforced plastic (FRP) substrates 5. Between the pair of FRP substrates 5, the space between the plurality of gradient-index rod lenses 1b and the space between the FRP substrate 5 and the gradient-index rod lenses 1b are filled with black resin 7. Thus, between the pair of FRP substrates 5, the plurality of gradient-index rod lenses 1b are made into one unit. The rod lens array 10b having such a configuration can be produced, for example, as described below. First, the plurality of gradient-index rod lenses 1b are arrayed substantially parallel to each other on the surface of one FRP substrate 5, and the lenses are sandwiched by the other FRP substrate 5. Subsequently, the space between the pair of FRP substrates 5 is filled with the black resin 7 to make all the portions into one unit. Further, the end surfaces of the gradient-index rod lenses 1b are polished as necessary.

As shown in FIG. 2, an erecting equal-magnification image is formed in a range of the radius of the field of view $X_0$ by one gradient-index rod lens 1b. In the image formed by the one gradient-index rod lens 1b, the quantity of light is highest on the optical axis of the gradient-index rod lens 1b and decreases with distance from the optical axis. Accordingly, the quantity of light varies in the field of view represented by the radius of the field of view $X_0$. Since the rod lens array is formed by arraying such gradient-index rod lenses 1b, an unevenness of quantity of light occurs depending on the array pitch of the gradient-index rod lenses 1b.

In the case where a rod lens array with a large unevenness of quantity of light is used in an optical device, such as an inspection apparatus or an image sensor, the brightness of the image can fluctuate periodically in the main-scanning direction (the array direction of the rod lenses) depending on the array pitch of the rod lenses in the rod lens array. This may cause the optical device to be unable to exhibit a desired performance.

Figure 5:
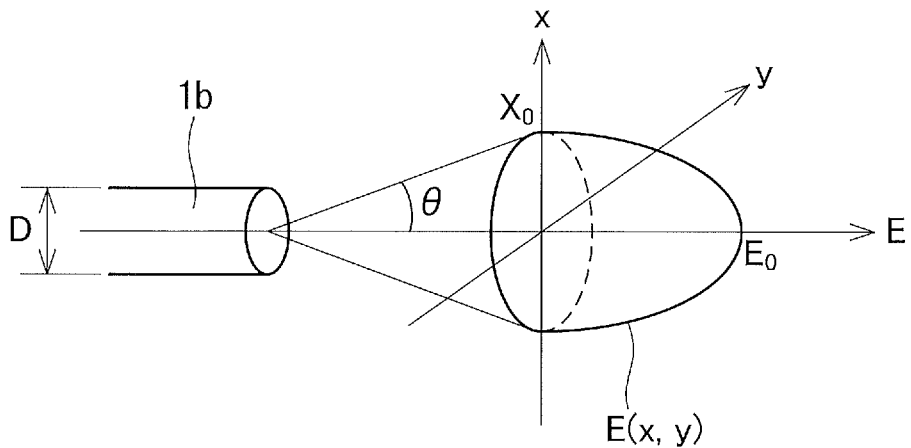
FIG. 5 is a diagram schematically showing the field of view and the light quantity distribution of the gradient-index rod lens.

FIG. 5 schematically shows the relation between the field of view of the erecting equal-magnification and the light quantity distribution in the gradient-index rod lens 1b having a diameter D. A light quantity distribution $E(x, y)$ in the field of view of the erecting equal-magnification is represented by the following Equation (3). In Equation (3), $E_0$ represents the light quantity at the center of the field of view of the erecting equal-magnification image. At the center of the field of view of the erecting equal-magnification, x=y=0 is satisfied.

$$E(x,y)=E_0\sqrt{\{1-(x^2+y^2)/X_0^2\}} \qquad \text{Equation (3)}$$

Figure 6:
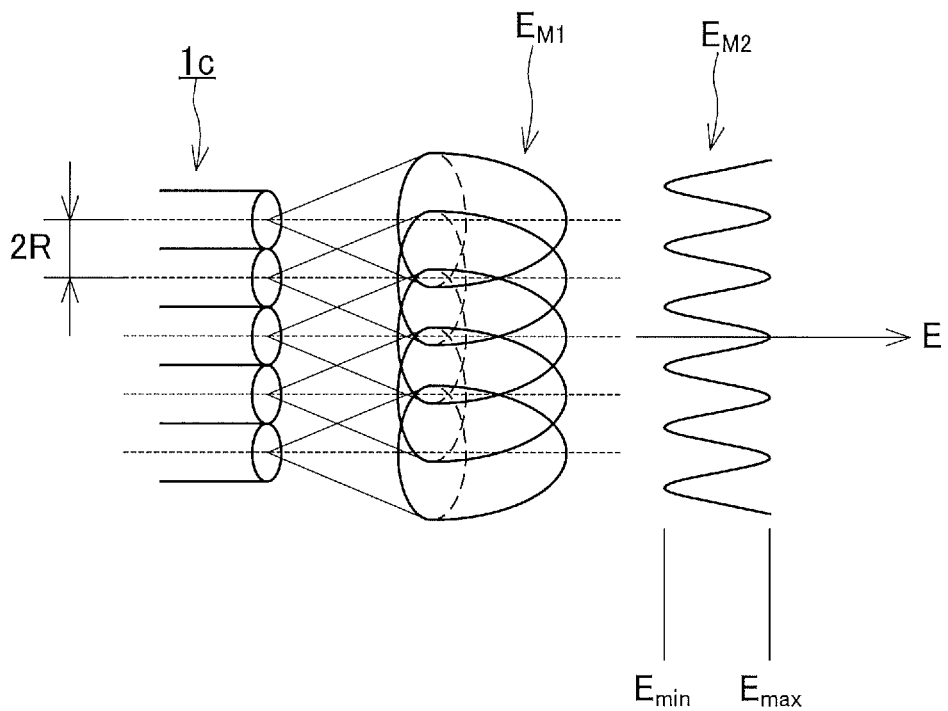
FIG. 6 is a diagram schematically showing the light quantity distribution of the rod lens array.
Figure 7A:
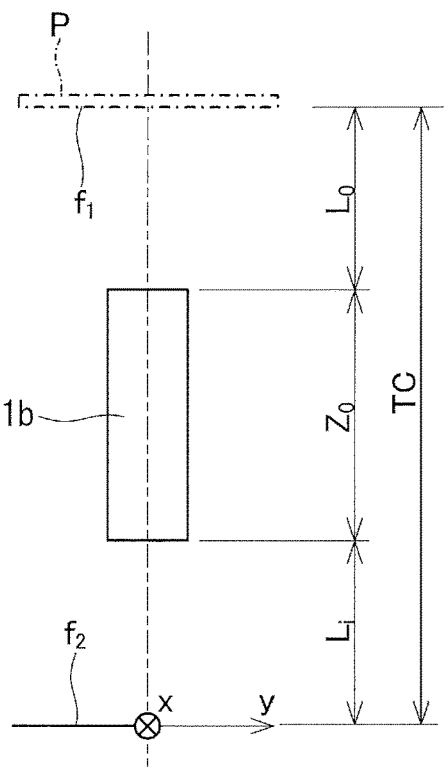
FIG. 7A is a diagram showing a reference line in a rod lens array in which the gradient-index rod lenses are arrayed in one row.
Figure 7B:
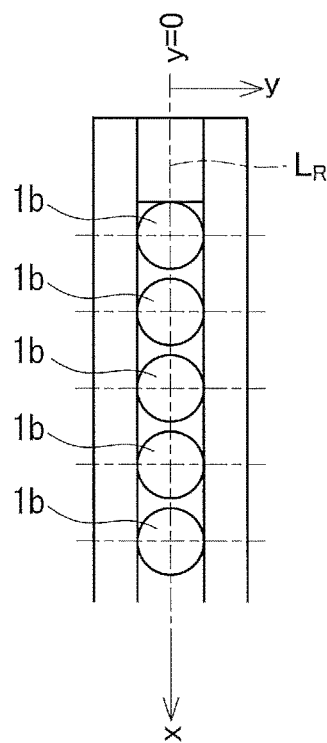
FIG. 7B is a diagram showing the reference line in the rod lens array in which the gradient-index rod lenses are arrayed in one row.
Figure 8A:
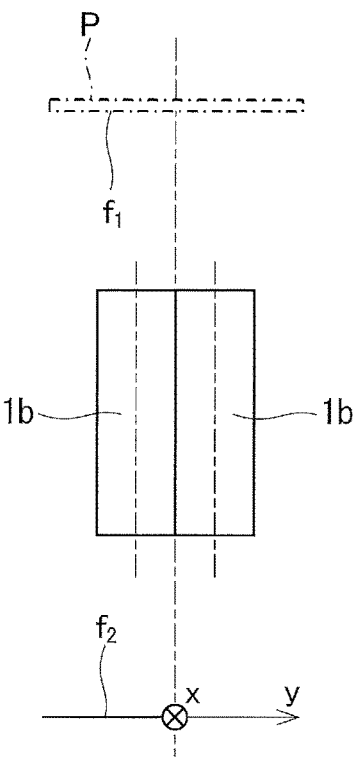
FIG. 8A is a diagram showing a reference line in a rod lens array in which gradient-index rod lenses are arrayed in two rows.
Figure 8B:
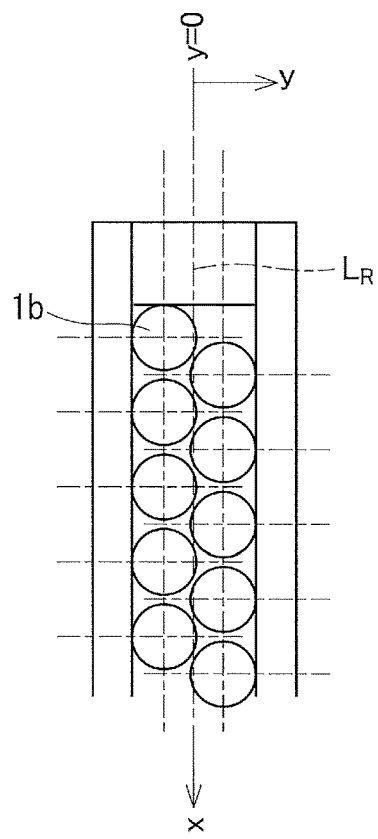
FIG. 8B is a diagram showing the reference line in the rod lens array in which gradient-index rod lenses are arrayed in two rows.
Figure 9A:
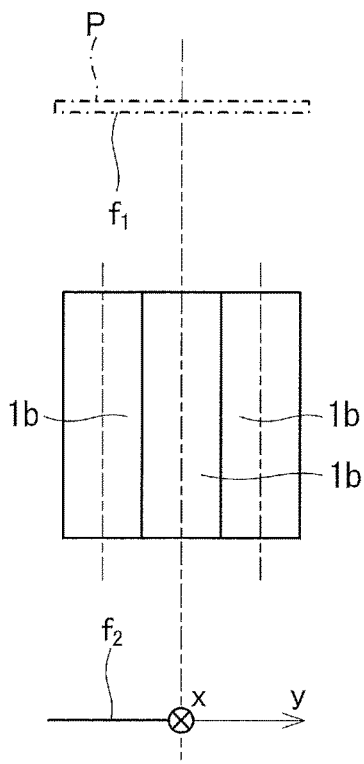
FIG. 9A is a diagram showing a reference line in a rod lens array in which gradient-index rod lenses are arrayed in three rows.
Figure 9B:
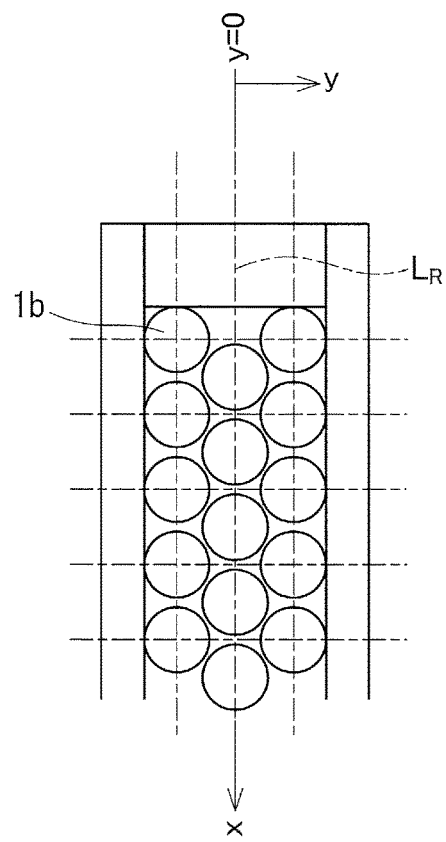
FIG. 9B is a diagram showing the reference line in the rod lens array in which gradient-index rod lenses are arrayed in three rows.

FIG. 6 schematically shows light quantity distributions $E_{M1}$ and $E_{M2}$ in a rod lens array in which the gradient-index rod lenses 1b having the above light quantity distribution $E(x, y)$ are arrayed in an array shape. The light quantity distribution $E_{M1}$ represents the light quantity distributions of the gradient-index rod lenses 1b individually, and the light quantity distribution $E_{M2}$ represents a composition of the light quantity distributions of the gradient-index rod lenses 1b. The light quantity distribution in the rod lens array exhibits a periodic unevenness of quantity of light along the main-scanning direction (x direction) depending on the array pitch of the gradient-index rod lenses 1b. An unevenness of quantity of light $\Delta E_{(0,0)}$ along the reference line is represented by, for example, the following Equation (4). In Equation (4), $E_{max}$ and $E_{min}$ respectively represent the maximum value and the minimum value in the light quantity distribution along the reference line. The unevenness of quantity of light $\Delta E_{(0,0)}$ can be determined by actually producing the rod lens array and measuring the light quantity distribution. Further, in the case where the optical constant of the gradient-index rod lens 1b is known, $\Delta E_{(0,0)}$ can be calculated on the basis of Equations (3) and (4). The rod lens array has, for example, a lens group in which the plurality of gradient-index rod lenses 1b are arrayed in a row along the main-scanning direction. With regard to the unevenness of quantity of light $\Delta E_{(0,0)}$, the reference line is a line of an intersection between an image plane of an erecting equal-magnification image and specifical plane. The specifical plane is a plane equidistant in the sub scanning direction (y direction) from one virtual end line and the other virtual end line of the lens group (rod lens array) in an end surface of the gradient-index rod lens 1b viewed along a direction parallel to the central axis of the gradient-index rod lens 1b. FIGS. 7A and 7B conceptually show a reference line $L_R$ of a rod lens array having a lens group in which the plurality of gradient-index rod lenses 1b are arrayed in one row. FIGS. 8A and 8B conceptually show the reference line $L_R$ of a rod lens array having a lens group in which the plurality of gradient-index rod lenses 1b are arrayed in two rows. FIGS. 9A and 9B conceptually show the reference line $L_R$ of a rod lens array having a lens group in which the plurality of gradient-index rod lenses 1b are arrayed in three rows. In FIGS. 7A to 9B, the reference line $L_R$ is a straight line that extends in the main-scanning direction (x direction) and is positioned so as to satisfy y=0 in the sub-scanning direction (y direction). In FIGS. 7A to 9B, the sign P represents an object such as a document or an object to be inspected, and the sign $f_1$ represents a plane that can be a reading plane or an inspection plane for the object. Further, the sign $f_2$ represents an image plane.

$$\Delta E_{(0,0)}=(E_{max}-E_{min})/E_{min} \qquad \text{Equation (4)}$$

In a rod lens array having a lens group in which the plurality of gradient-index rod lenses 1b are arrayed in a row along the main-scanning direction, the unevenness of quantity of light $\Delta E_{(0,0)}$ along the reference line is not limited to any specific value. The unevenness of quantity of light $\Delta E_{(0,0)}$ along the reference line is, for example, 6% or less. This facilitates formation of an erecting equal-magnification image with a desired quantity of light in an optical device using the rod lens array. A predetermined domain is a domain for which the light quantity distribution has substantial periodicity in the main-scanning direction (x direction), where the unevenness of quantity of light $\Delta E_{(0,0)}$ along the reference line may be obtained, for example, within the predetermined domain. The predetermined domain is a domain for which the light quantity distribution has substantial periodicity in the main-scanning direction (x direction), where examples of the predetermined domain may include: y=0 and the x-direction range being 10 mm; y=0 and the x-direction range being 4 mm; and y=0 and the x-direction range being 2 mm. Further, when the middle position in the above x-direction range is defined as x=0, the respective examples of the predetermined domain can be expressed by: y=0 and −5 mm≤x≤5 mm; y=0 and −2 mm≤x≤2 mm; and y=0 and −1 mm≤x≤1 mm. Moreover, a position equidistant from one virtual end line and the other virtual end line of the rod lens array or the center of one of the lenses that is closest to this position may be defined as x=0. At this time, since the position of x=0 is determined in advance, the predetermined range in the x direction may be determined so as to include the position.

The unevenness of quantity of light $\Delta E_{(0,0)}$ along the reference line is desirably 5% or less, and more desirably 4% or less. On the other hand, the unevenness of quantity of light $\Delta E_{(0,0)}$ along the reference line is, for example, 1% or more. Accordingly, it is easy to avoid adjustment of the aperture angle that would cause a decrease in DOF in the gradient-index rod lens 1b.

The rod lens array 10b can be modified from various viewpoints, and materials known in producing the rod lens array may be used as materials of each of the components of the rod lens array. Further, the array of the plurality of gradient-index rod lenses 1b is not limited to two rows. The plurality of gradient-index rod lenses 1b may be arrayed in one row, two rows, or three or more rows. By arraying the gradient-index rod lenses 1b in a large number of rows, it is possible to provide a rod lens array suitable for a large area.

The gradient-index rod lens 1b can be a plastic rod lens having the above optical performance. The plastic rod lens can be produced by, for example, a copolymerization method, a sol-gel method, or an inter-diffusion method. Especially in the inter-diffusion method, resins whose refractive index gradually decreases from the center toward the outer periphery are laminated concentrically, and then counter diffusion of materials between the layers is performed such that the refractive index varies continuously. After such a treatment, the resins are further heated to be stretched. Thus, a bar-like rod lens is obtained. The plastic rod lens is easy to handle and generally inexpensive owing to its material properties, and has advantages in some cases.

The rod lens array including the gradient-index rod lens 1b has a large DOF, and is excellent in weather resistance in some cases, and can be widely used in optical devices such as scanners, copiers, facsimiles, printers, CISs, and line cameras. In other words, it is possible to provide an optical device including the rod lens array. Further, owing to being excellent particularly in water resistance (moisture resistance), the rod lens array including the gradient-index rod lens 1b is applicable to the above optical devices and the like not only in general air conditioning for offices and the like but also in various environments including factories exposed to high temperature and high humidity conditions and logistics, such as storage warehouses and transport trucks.

The optical device including the rod lens array further includes, for example, a linear light source and an optical sensor.

Figure 10:
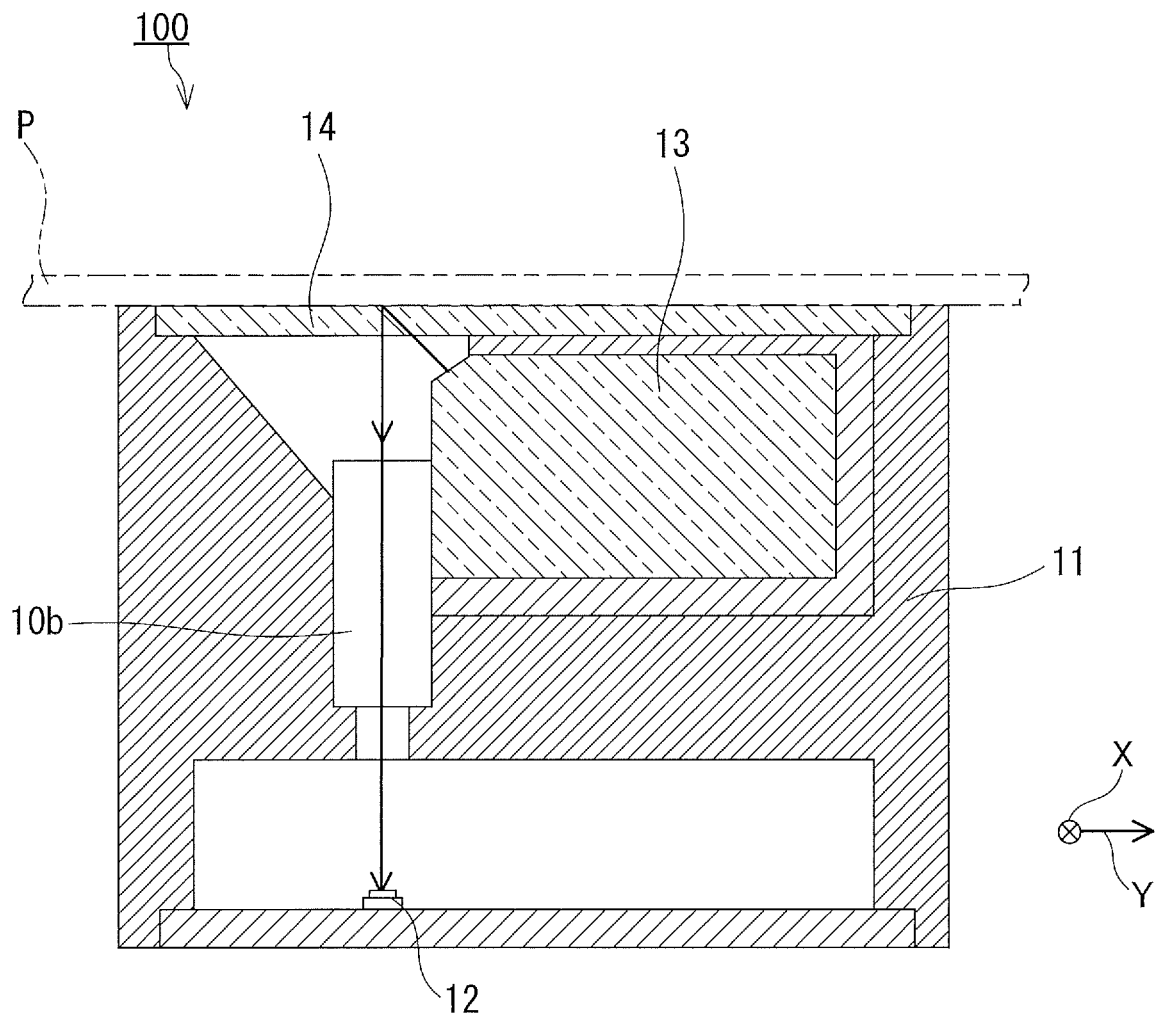
FIG. 10 is a cross-sectional view showing an example of an optical device including the rod lens according to the present invention.

The rod lens array 10b can be used to provide, for example, a contact image sensor (CIS) 100 shown in FIG. 10. The CIS 100 includes, for example, the rod lens array 10b, a housing 11, a linear optical sensor 12, a linear illuminator 13, and a document platen 14. The linear optical sensor 12 extends in the main-scanning direction of the rod lens array 10b. In FIG. 10, a direction parallel to the X-axis is the main-scanning direction, and a direction parallel to the Y-axis is the sub-scanning direction. The linear illuminator 13 extends in the main-scanning direction of the rod lens array 10b. The document platen 14 is formed of a glass sheet. The glass sheet forming the document platen 14 is disposed so as to cover the opening of the housing 11. The rod lens array 10b, the linear optical sensor 12, and the linear illuminator 13 are disposed inside the housing 11. The linear illuminator 13 linearly illuminates a document P placed on the document platen 14 with illumination light. The rod lens array 10b is disposed such that light reflected from the surface of the document P enters the linear optical sensor 12. In other words, the linear optical sensor 12 is disposed such that the light reflected from the document is collected through the rod lens array 10b. By scanning the mechanism including the rod lens array 10b and the linear optical sensor 12 in the sub-scanning direction or by conveying the document P placed on the document platen 14 in the sub-scanning direction, two-dimensional image data relating to the document P can be obtained. The image sensor 100 may be configured to be capable of imaging an object other than a document.

Since the rod lens array 10b includes the gradient-index rod lens 1b having a large DOF, a read image with a favorable quality is easily achieved even with respect to, for example, a partially floating portion of the document P caused by a wrinkle, a spread portion, or the like.

Figure 11:
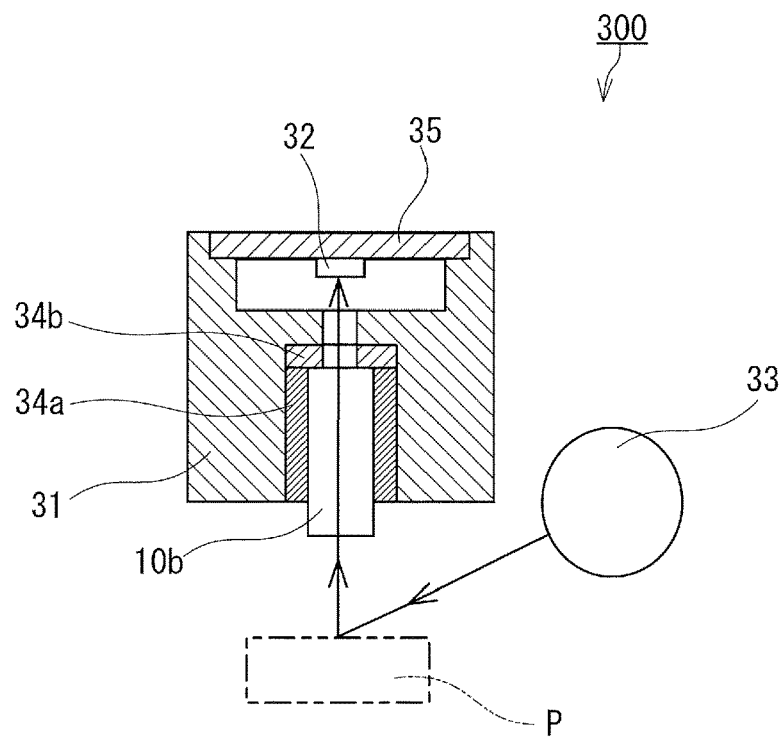
FIG. 11 is a cross-sectional view showing another example of the optical device including the rod lens according to the present invention.

The rod lens array 10b can be used to provide, for example, an image sensor 300 shown in FIG. 11. The image sensor 300 includes a housing 31, a linear optical sensor 32, a linear illuminator 33, a first spacer 34a, a second spacer 34b, and a substrate 35. In the image sensor 300, the linear illuminator 33 is disposed outside the housing 31. For example, in the image sensor 300, to appropriately adjust the optical arrangement of a portion of the document P to be read and the linear optical sensor 32, the rod lens array 10b is positioned relative to and fixed to the housing 31 by the first spacer 34a and the second spacer 34b. The image sensor 300 may be applied to an apparatus for inspecting the appearance of an inspection object, and may be used to obtain an image from the inspection object (object to be inspected) instead of the document P. In this case, the inspection object is irradiated with a beam emitted from the linear illuminator 33, and light reflected from the surface of the inspection object is imaged on the linear optical sensor 32 by the imaging action of the rod lens array 10b. The linear optical sensor 32 can sequentially convert one-dimensional image information of the surface of the inspection object into electric signals for output.

Figure 12:
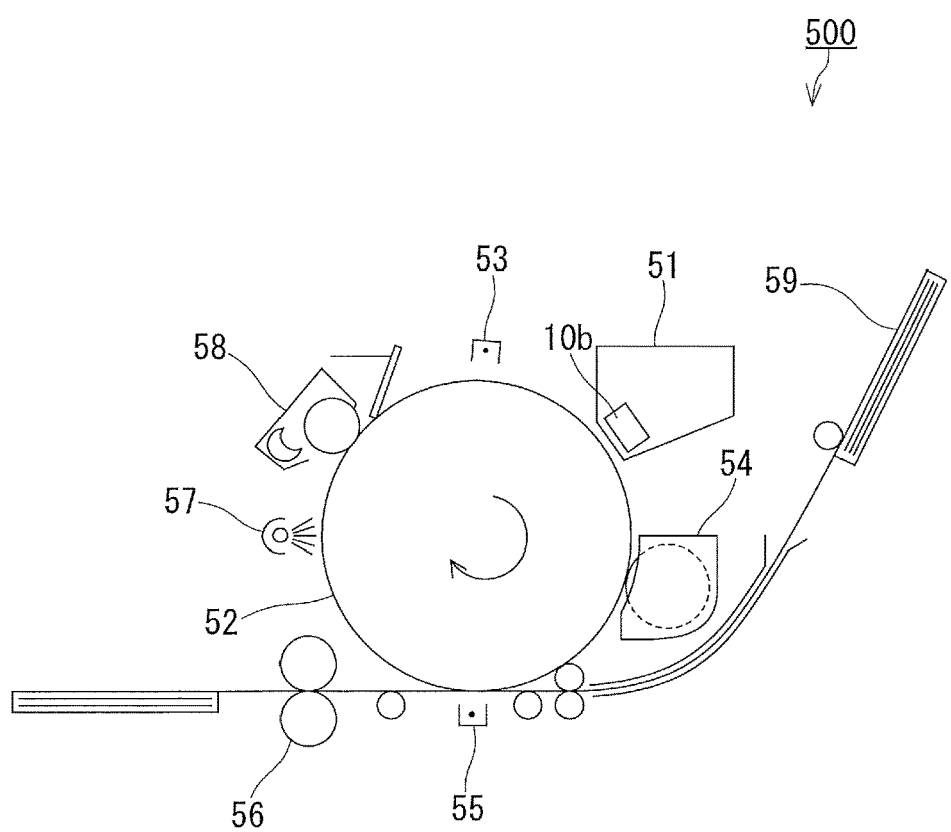
FIG. 12 is a cross-sectional view showing still another example of the optical device including the rod lens according to the present invention.

The rod lens array 10b can be used to provide, for example, a printer 500 shown in FIG. 12. The printer 500 includes a write head 51, a photosensitive drum 52, a charger 53, a developer 54, a transfer device 55, a fixing device 56, an erase lamp 57, a cleaner 58, and a sheet feeding cassette 59. The rod lens array 10b is disposed inside the write head 51. The printer 500 is an electrophotographic printer. The write head 51 includes the rod lens array 10b and a light emitting element array (not shown). The rod lens array 10b constitutes an imaging optical system for exposure of light emitted from the light emitting element array onto the photosensitive drum 52. In detail, the rod lens array 10b has a focal point located on the surface of the photosensitive drum 52 to constitute an erecting equal-magnification optical system. On the surface of the photosensitive drum 52, a photosensitive layer formed of a material having photoconductivity (photoreceptor), such as amorphous Si, is formed.

First, the charger 53 uniformly charges the surface of the photosensitive drum 52 that is rotating. Next, the write head 51 irradiates the photosensitive layer of the photosensitive drum 52 with light of a dot image corresponding to an image to be formed. This neutralizes the charge in the light irradiation region of the photosensitive layer, and thus a latent image is formed on the photosensitive layer. Next, toner is carried onto the photosensitive layer by the developer 54. In accordance with the charged state of the photosensitive layer, the toner adheres to the portion of the photosensitive layer where the latent image has been formed. Next, the transfer device 55 transfers the adhering toner onto a sheet fed from the cassette. Subsequently, the fixing device 56 heats the sheet to fix the toner onto the sheet. Thus, an image is formed. On the other hand, after the transfer is completed, the erase lamp 57 neutralizes the charge across the entire region of the photosensitive drum 52. Subsequently, the cleaner 58 removes the toner remaining on the photosensitive layer.

Figure 13:
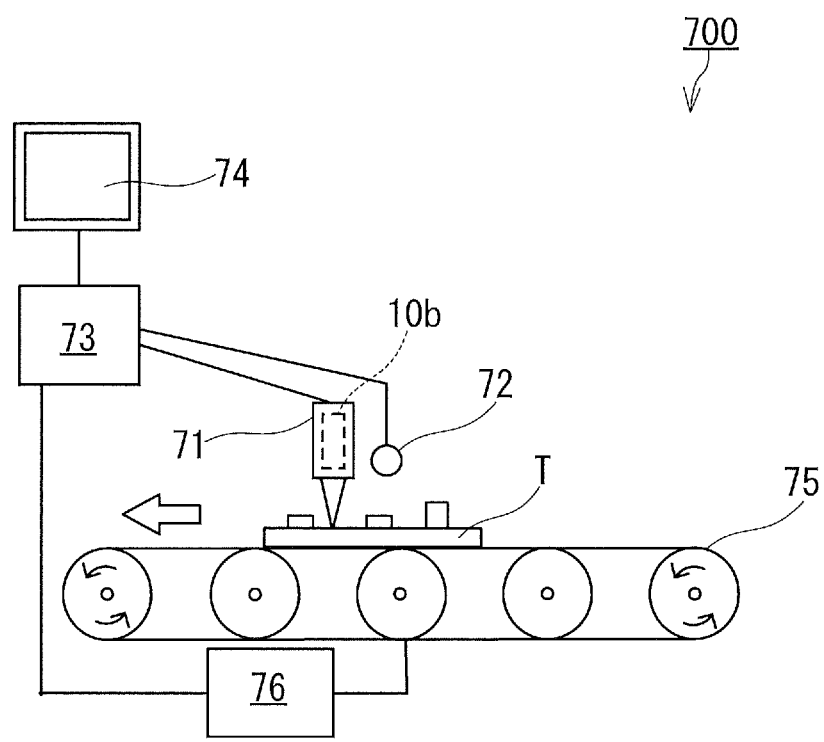
FIG. 13 is a cross-sectional view showing still another example of the optical device including the rod lens according to the present invention.

The rod lens array 10b can be used to provide, for example, an inspection apparatus 700 shown in FIG. 13. The inspection apparatus 700 includes an image sensor 71, a linear illuminator 72 as the light source, a controller 73, an output device 74, a conveyor 75, and a conveyance control device 76. Inside the image sensor 71, the rod lens array 10b is disposed. The conveyor 75 is, for example, a belt conveyor. The conveyor 75 conveys an inspection object T, such as a printed-circuit board, a textile, or a sheet. The conveyance control device 76 is a digital computer for controlling the conveyor 75, and outputs a control signal for adjusting the conveying speed of the conveyor 75 to the conveyor 75. The image sensor 71 and the linear illuminator 72 are, for example, disposed above the conveyor 75, and the conveyor 75 causes the inspection object T to pass just under the image sensor 71. The image sensor 71 and the linear illuminator 72 are disposed such that clear image data of the inspection object T is obtained. The controller 73 is a digital computer for forming image data of the inspection object T. When the inspection object T passes just under the image sensor 71, the controller 73 continuously acquires one-dimensional image information from the image sensor 71. In addition, the controller 73 acquires conveyance position information of the inspection object T from the conveyance control device 76. The controller 73 performs calculation processing on the basis of the one-dimensional image information acquired from the image sensor 71 and the conveyance position information acquired from the conveyance control device 76 to form two-dimensional image information. The two-dimensional image information thus formed is compared with information featuring a defect, such as foreign matters, cracks, and pinholes, stored beforehand in the controller 73. The controller 73 thus specifies the presence or absence of a defect, the number of defects, and the position of the defect in the inspection object T. The controller 73 may determine whether the inspection object T is defective on the basis of the comparison results. The output device 74 is, for example, a monitor, and displays the two-dimensional image information formed by the controller 73.

Figure 14:
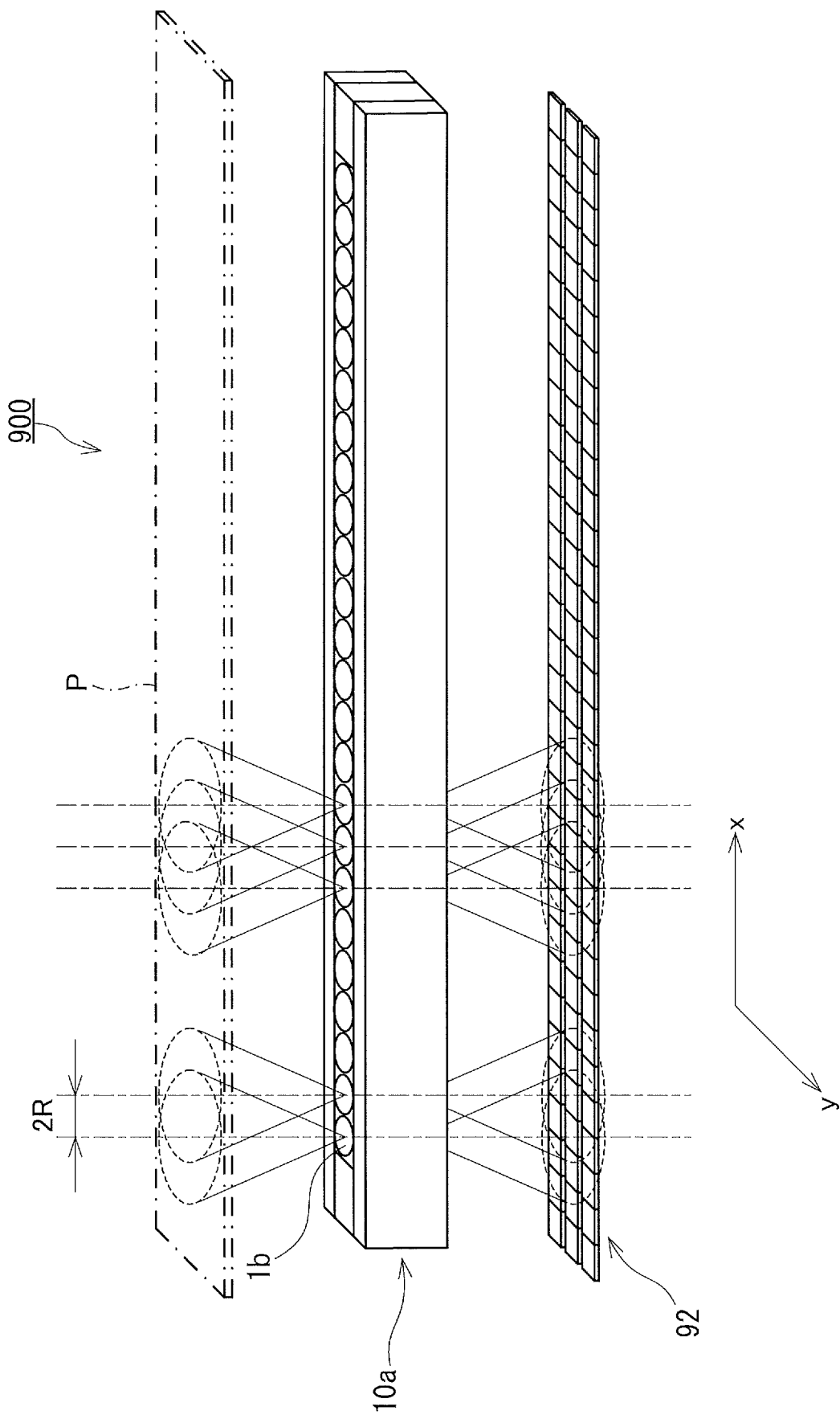
FIG. 14 is a perspective view showing still another example of the optical device including the rod lens array according to the present invention.

The above optical devices, such as the CIS, the image sensor, and the inspection apparatus, may be configured to be capable of acquiring a color image of an object, such as an object to be inspected, a subject, and a document. For example, as shown in FIG. 14, an optical device 900 employing color filters can be provided. The optical device 900 includes the rod lens array 10a, a white light source (not shown), and an optical sensor 92. The white light source emits light of different wavelengths, such as R, G, and B. The white light source is, for example, a linear light source. The optical sensor 92 is disposed along the main-scanning direction of the rod lens array 10a and has a plurality of segments with different dominant wavelengths. The optical sensor 92 is, for example, a sensor such as photodiode including respective color filters corresponding to R (red), G (green), and B (blue). The plurality of segments each include, for example, respective color filters corresponding to R, G, and B arrayed in the sub-scanning direction (y direction). As shown in FIG. 14, the plurality of segments of the optical sensor 92 are arrayed in the main-scanning direction (x direction). Pixel information pieces corresponding to R, G, and B are formed in the segments and are synthesized to obtain a color image of the object.

It is also conceivable to configure, as an image sensor capable of acquiring a color image, an image sensor employing a light source sequential turning system. On the other hand, an image sensor employing color filters has advantages such as small color misregistration in the sub-scanning direction and good color reproducibility corresponding to each of the R, G, and B colors.

In a rod lens array of the image sensor employing color filters, the optical performance is important not only at a position shifted from the reference position in the axial direction of a rod lens but also at a position shifted by a predetermined distance from the reference position in the sub-scanning direction (y direction). As for the unevenness of quantity of light as well, it is important that the unevenness of quantity of light along the main-scanning direction at the position shifted by the predetermined distance in the sub-scanning direction of the rod lens array (y direction) is small. The unevenness of quantity of light at the position shifted by the predetermined distance y in the sub-scanning direction is represented by $\Delta E_{(y,0)}$.

In a rod lens array having a lens group in which the plurality of gradient-index rod lenses 1b are arrayed in a row along the main-scanning direction, an unevenness of quantity of light $\Delta E_{(y,0)}$ for a domain at a distance of 0 to 0.5 mm from the reference line $L_R$ of an image plane in the sub-scanning direction (y=0 to 0.5) is, for example, 12% or less. It is understood that the smaller the value of the unevenness of quantity of light $\Delta E_{(y,0)}$, the better the performance of the rod lens array. On the other hand, from the viewpoint of the unevenness of quantity of light $\Delta E_{(y,0)}$, an excessively high performance of the rod lens array tends to cause a great difficulty in forming a refractive-index distribution in the gradient-index rod lens 1b, making it difficult to suppress the performance variation in the actual manufacturing process. Adjusting the aperture angle of the gradient-index rod lens 1b within a predetermined range easily reduces the value of $\Delta E_{(y,0)}$ that represents one of the optical performance of the gradient-index rod lens 1b in the axial direction.

In the above rod lens array, the unevenness of quantity of light $\Delta E_{(y,0)}$ for the domain at a distance of 0 to 0.5 mm from the reference line $L_R$ of the image plane in the sub-scanning direction (y=0 to 0.5) is desirably 10% or less. In the above rod lens array, the unevenness of quantity of light $\Delta E_{(y,0)}$ for the domain at a distance of 0 to 0.3 mm from the reference line $L_R$ of the image plane in the sub-scanning direction (y=0 to 0.3) is, for example, 6% or less, and desirably 5% or less. In the above rod lens array, the unevenness of quantity of light $\Delta E_{(y,0)}$ for the domain at a distance of 0 to 0.1 mm from the reference line $L_R$ of the image plane in the sub-scanning direction (y=0 to 0.1) is, for example, 5% or less, and desirably 4% or less.

The unevenness of quantity of light $\Delta E$ can be calculated by the measurement using the rod lens array as described above, and also can be calculated from known parameters of the rod lens. Further, to evaluate the unevenness of quantity of light $\Delta E$ of the rod lens array, it is possible to use an overlapping degree M of the rod lens array, where the overlapping degree M is the ratio of the radius of the field of view to the array pitch. The overlapping degree M is represented by $M=X_0/2R$. One cause for the unevenness of quantity of light is the light quantity distribution in an image formed by one rod lens. Accordingly, on the assumption of a case where a plurality of rod lenses are arrayed such that a region of the field of view with a low quantity of light of a specific rod lens is compensated by another rod lens, it is understood that using the value obtained by the radius of the field of view divided by the array pitch of the rod lenses is appropriate. The sign $X_0$ represents the radius of the field of view, and the sign 2R represents the array pitch of the rod lens array, namely the distance between the central axes of adjacent rod lenses. As described later, the unevenness of quantity of light along the main-scanning direction at a position shifted in the sub-scanning direction can be evaluated by the overlapping degree M.

The overlapping degree M of the rod lens array including the plurality of gradient-index rod lenses 1b is not limited to any specific value, and is, for example, 1.4 to 3.6. This easily reduces the unevenness of quantity of light while maintaining the DOF within a desired range. From the viewpoint of reducing the unevenness of quantity of light, the overlapping degree M of the rod lens array is desirably 1.6 or more, more desirably 1.8 or more, and still more desirably 2.0 or more. From the viewpoint of the DOF, the overlapping degree M of the rod lens array is desirably 3.4 or less, and more desirably 3.2 or less.

To provide the rod lens array in an inspection apparatus for industrial products, a high reliability and a sufficient tolerance are important. There are acceptable ranges for various industrial products in consideration of quality variations. Accordingly, in an inspection apparatus using the rod lens array, it is important to maintain the inspection reliability with the assumption of such quality variations.

The properties of the rod lens array such as the unevenness of quantity of light and the overlapping degree M relating to the unevenness of quantity of light are indexes to be used for evaluation in expanding the range of products to which the rod lens array is applicable. On the other hand, these properties are those only for evaluating the optical performance relating to the shift in the sub-scanning direction (y direction). It is important for optical devices using a rod lens array to have a small fluctuation in unevenness of quantity of light even with a fluctuation in height of a document or an object to be inspected, such as the depth of field (DOF).

A depth of the unevenness of quantity of light is used, for example, for the fluctuation of the unevenness of quantity of light relating to the shift of the rod lens of the rod lens array in the optical axis direction. The depth of the unevenness of quantity of light is the maximum value of the unevenness of quantity of light at the distance y from the reference line $L_R$ in the sub-scanning direction and at the position of the object plane shifted by ΔL in a direction parallel to the optical axis of the rod lens of the rod lens array from the position of the object plane at which the value of the MTF is maximum. This depth of the unevenness of quantity of light is represented by $\Delta E_{(y,\Delta L)}$. The value ΔL is a negative value when the distance between the object plane and the rod lens array in the direction parallel to the optical axis is smaller than $L_i$, and the value ΔL is a positive value when the distance is larger than $L_i$.

In a rod lens array having a lens group in which the plurality of gradient-index rod lenses 1b are arrayed in a row along the main-scanning direction, the depth of the unevenness of quantity of light $\Delta E_{(y,\Delta L)}$ is, for example, 25% or less, where the value of y representing the shift in the sub-scanning direction (y direction) is 0 to 0.5 mm and the value of ΔL is −1.5 mm to 1.5 mm. Thus, the optical device including the rod lens array tends to have a small fluctuation in the unevenness of quantity of light even with a fluctuation in height of an object such as a document or an object to be inspected.

The depth of the unevenness of quantity of light $\Delta E_{(y,\Delta L)}$ for the above value domains of y and ΔL is desirably 15% or less, more desirably 10% or less, and still more desirably 8% or less. The depth of the unevenness of quantity of light $\Delta E_{(y,\Delta L)}$ required for the rod lens array can vary depending on the quality level of the object such as a document and an object to be inspected. For example, in the case where a high-quality image is required to be acquired with ΔL or y that is not so large, the depth of the unevenness of quantity of light $\Delta E_{(y,\Delta L)}$ with y being 0 to 0.3 mm and ΔL being −1.0 mm to 1.0 mm is, for example, 8% or less, and desirably 6% or less. Further, $\Delta E_{(y,\Delta L)}$ with y being 0 to 0.2 mm and ΔL being −0.5 mm to 0.5 mm is, for example, 6% or less, and desirably 4% or less.

EXAMPLES

The present invention will be described below in more detail with use of examples. The present invention is not limited to the following examples.
(Preparation of Glass Composition and Production of Gradient-Index Rod Lens)

Glass raw materials were mixed such that the compositions shown in Table 1 would be achieved, and the resulting mixtures were melted. Thus, molten glasses (glass compositions) according to Examples 1 to 4, Comparative Examples 1 to 3, and Reference Example 1 were obtained. The numerical values in Table 1 are given in mol %. The relations among the contents of predetermined components on the basis of mol % in the glass compositions are shown in Table 2. The molten glasses were each spined and molded into fibrous form, the resulting glass fiber was cut into a predetermined length, and the cut face was polished. Thus, glass rods according to the examples, the comparative examples, and Reference Example 1 were obtained. The glass rods each had a diameter (rod diameter) of 560 μm. Next, the glass rods were each immersed in a sodium nitrate molten salt that has been heated around the glass transition temperature of the glass composition constituting the glass rod, so that an ion exchange process was performed. Thus, a refractive-index distribution was formed in each of the glass rods. Subsequently, the glass rods after the ion exchange process were each cut to have one pitch length, and the resulting end surface was polished. Thus, gradient-index rod lenses according to the examples, the comparative examples, and Reference Example 1 were obtained.
(Property Evaluation)

The gradient-index rod lens produced as above was cut into an appropriate length, and the resulting cut face of the sample was mirror-polished. Next, a sheet with a grid pattern was brought into contact with one end surface of the sample, and an erecting image of the pattern was observed from the other end surface of the sample. Thus, a pitch P was determined for each of the gradient-index rod lenses. Next, on the basis of the relation $\sqrt{A}=2\pi/P$, the refractive-index distribution coefficient $\sqrt{A}$ was determined for each of the gradient-index rod lenses. Next, the aperture angle θ was determined for each of the gradient-index rod lenses on the basis of the refractive-index distribution coefficient $\sqrt{A}$, the radius $r_0$ of the gradient-index rod lens, the value of the refractive index Nc of the glass rod before the ion exchange process, and the relation shown in the following Equation (5). The results are shown in Table 3. The refractive index Nc was 1.60, which could be regarded as the refractive index no on the optical axis of the gradient-index rod lens.

$$\theta=\sin^{-1}\{\sqrt{A}\cdot Nc\cdot r_0\} \quad \text{Equation (5)}$$

The refractive index Nc was determined by evaluating the refractive index of each of the glass compositions according to the examples, the comparative examples, and Reference Example 1. A base glass consisting of the glass composition was cut out to a rectangular parallelepiped sample with a cross-sectional area of 15 meters square, and the refractive index Nc was evaluated in accordance with the V-block method described in JIS B 7071-2: 2018. According to the method, the sample is placed on a V-block prism, and a measurement of the angle of deviation is performed for a spectral beam that is refracted by the sample during transmission of the beam. The method is a method of relatively calculating the refractive index of the sample from the value of the angle of deviation and the known refractive index of the V-block prism. For the evaluation, KPR-3000 manufactured by Shimadzu Corporation was used.

(Water Resistance Evaluation)

The water resistance was evaluated for the glass compositions in accordance with JOGIS 06-2009. A sample produced from each of the glass compositions was placed in boiling water for 1 hour to measure the weight loss, and the water resistance of the glass composition was evaluated according to the weight loss. The water resistance as defined in JOGIS 06-2009 is classified into Class 1 to Class 6. Glass having a water resistance of Class 1 can be regarded as having an excellent weather resistance, especially moisture resistance.

(Dof Measurement)

Figure 15:
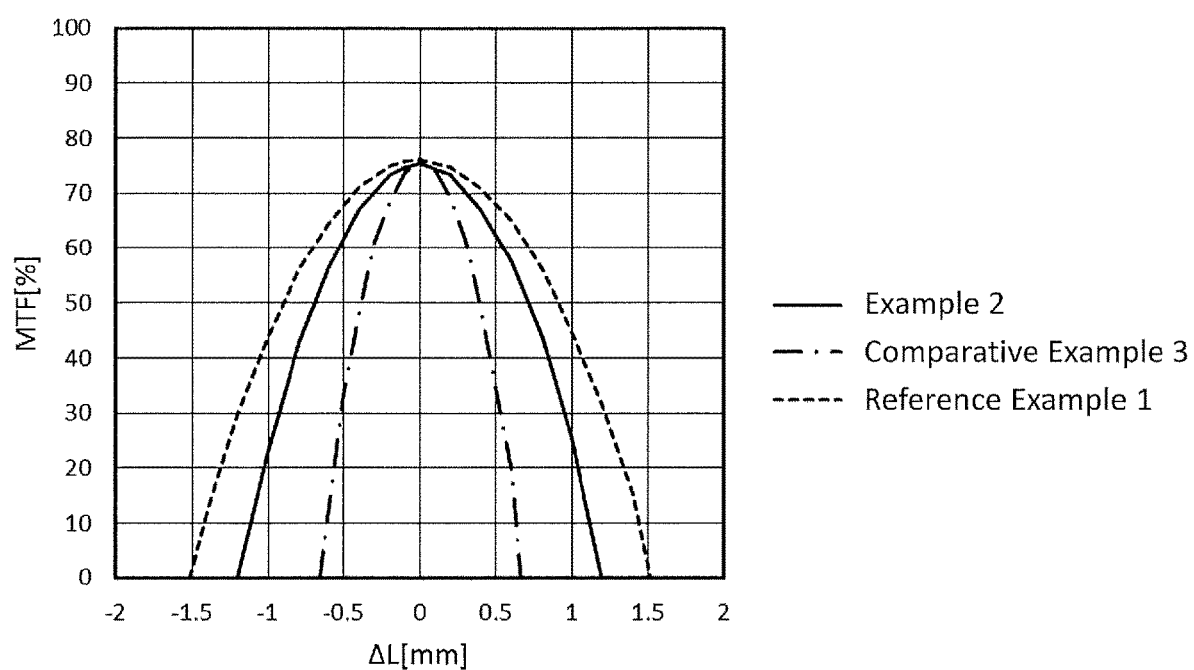
FIG. 15 is a graph showing the relation between the value of the MTF and the working distance in gradient-index rod lenses according to Example 2, Comparative Example 3, and Reference Example 1.

For each of the gradient-index rod lenses, a predetermined treatment (asperity forming treatment) was performed on its lateral surface for the purpose of removing noise light. Subsequently, a plurality of the gradient-index rod lenses were arrayed two-dimensionally. Thus, a rod lens array was produced in which a plurality of gradient-index rod lenses are arrayed in two rows as shown in FIG. 4. Thus, rod lens arrays according to the examples, the comparative examples, and Reference Example 1 were obtained. A line pattern having six black and white line pairs at an interval of 1 mm was prepared. That is, this line pattern had a spatial frequency of 6 lp/mm. Light emitted from a halogen lamp was caused to pass through a color filter (transmission center wavelength: 530 nm, full width at half maximum: 15 nm) such that the line pattern was irradiated with the light. As shown in FIG. 1, the line pattern, each of the rod lens arrays, and a photodetector were disposed at the positions for which the value of the MTF of an erecting equal-magnification image is maximum. The distance between the rod lens array and the photodetector at this time was defined as a lens-imaging position distance $L_0$. The results are shown in Table 3. Subsequently, with the distance between the rod lens array and the photodetector kept constant, the value of the MTF was obtained for each of the positions while moving the line pattern in the optical axis direction. The range of the working distance for which the value of the MTF is 30% or more was specified from the relation between $\Delta L$ and the value of the MTF. Then, the minimum value of the working distance was subtracted from the maximum value of the working distance to determine the depth of field (DOF) for each of the gradient-index rod lenses. The results are shown in Table 3 along with the imaging distance TC, the radius of the field of view $X_0$, and the overlapping degree M. Further, FIG. 15 shows the relation between the value of the MTF and $\Delta L$ in each of the rod lens arrays according to Example 2, Comparative Example 3, and Reference Example 1.

As shown in Table 3, the rod lens arrays including the gradient-index rod lenses according to the examples each had a DOF being included in the range of 1.5 to 3.0 mm, which suggests that the gradient-index rod lenses according to the examples each had a desired DOF. In addition, the glass compositions according to the examples had a water resistance of Class 1. In contrast, the rod lens arrays including the gradient-index rod lenses according to the comparative examples each had a low DOF. The rod lens array including the gradient-index rod lens according to Reference Example 1 had a DOF of 2.4 mm. However, the glass composition according to Reference Example 1 had a water resistance of Class 4, which suggests that the glass composition according to Reference Example 1 was inferior to the glass compositions according to the examples in terms of water resistance.

(Unevenness of Quantity of Light and Overlapping Degree)

Figure 16A:
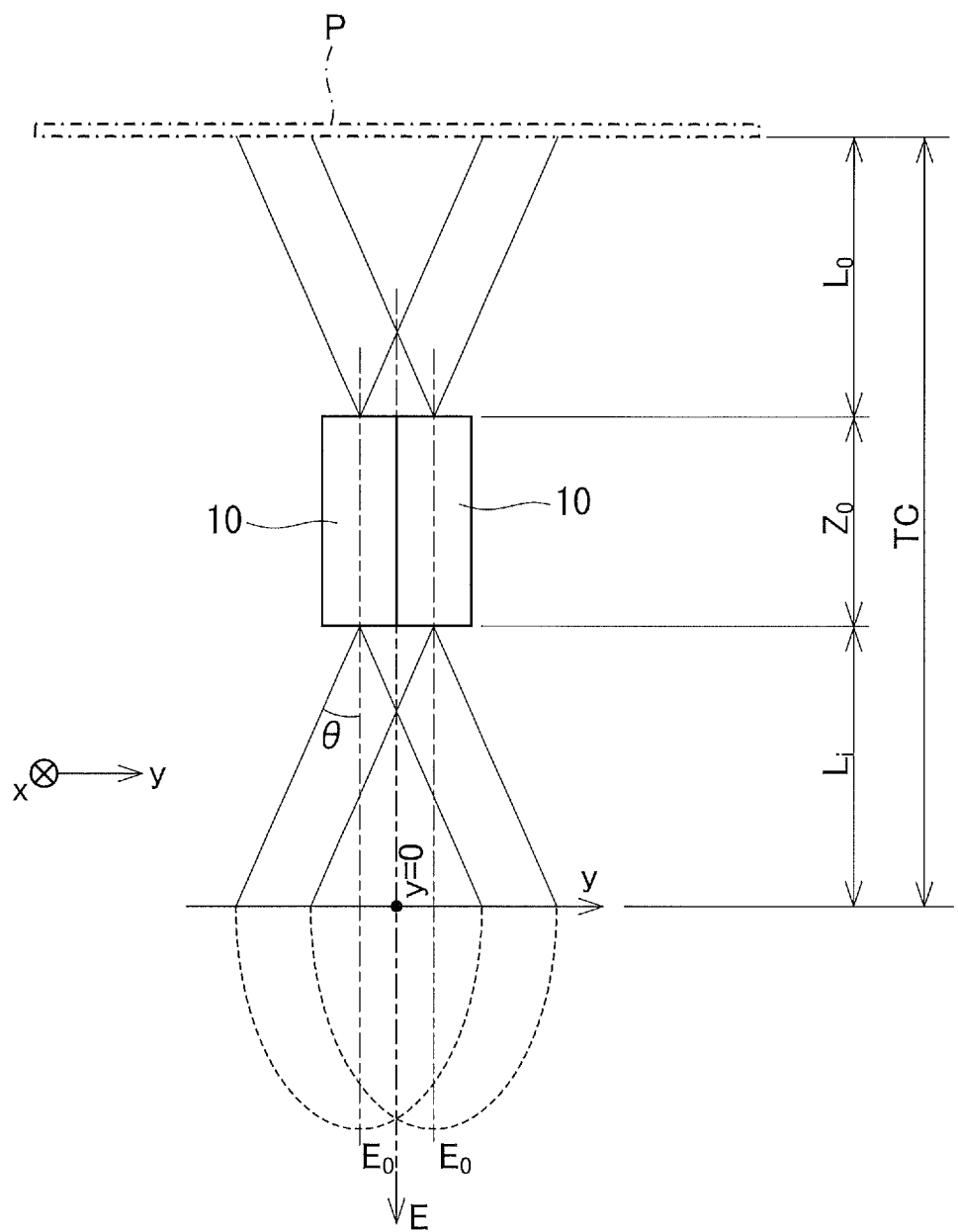
FIG. 16A is a diagram schematically showing an optical system for calculating the unevenness of quantity of light.
Figure 16B:
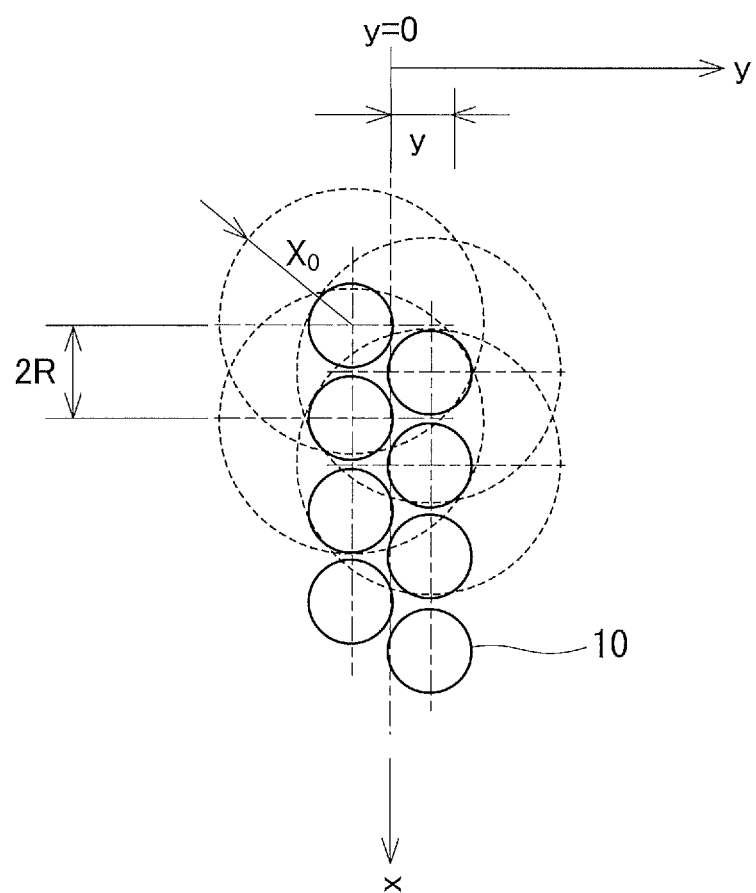
FIG. 16B is a diagram schematically showing the optical system for calculating the unevenness of quantity of light.

The unevenness of quantity of light was obtained for the rod lens arrays according to the examples, the comparative examples, and Reference Example 1 each having parameters as shown in Table 3. Considered as a model was an array in which rod lenses each having the parameters shown in Table 3 are arrayed in two rows as shown in FIG. 4. FIGS. 16A and 16B schematically show an optical system for calculating the unevenness of quantity of light. In FIGS. 16A and 16B, a rod lens 10 corresponds to the gradient-index rod lens in the rod lens arrays according to the examples, the comparative examples, and Reference Example 1. To obtain the model in which the MTF of the rod lens array is maximum, the gradient-index rod lenses were arrayed in accordance with the values shown in Table 3 regarding the imaging distance (TC) and the lens-imaging position distance $L_i$. In FIGS. 16A and 16B, the x direction is the main-scanning direction of the rod lens array, and the y direction is the sub-scanning direction of the rod lens array. A straight line representing y=0 corresponds to a shaft line of the rod lens array. The perpendicular lines drawn from the centers of the rod lenses arrayed in two rows to this straight line in the sub-scanning direction are equal in length. The value of y is the distance shifted from the axis of y=0.

Table 4 shows the value of the unevenness of quantity of light $\Delta E_{(y,0)}$ of each of the rod lens arrays according to the examples, the comparative examples, and Reference Example 1 calculated on the basis of Equations (3) and (4). This value of the unevenness of quantity of light is the value for $\Delta L=0$, and was determined from the light quantity distribution in a specific value of y at the imaging position $L_i$. The value of $\Delta E_{(y,0)}$ for y=0 mm is $\Delta E_{(0,0)}$. Table 3 shows the overlapping degree M of each of the rod lens arrays.

Figure 17:
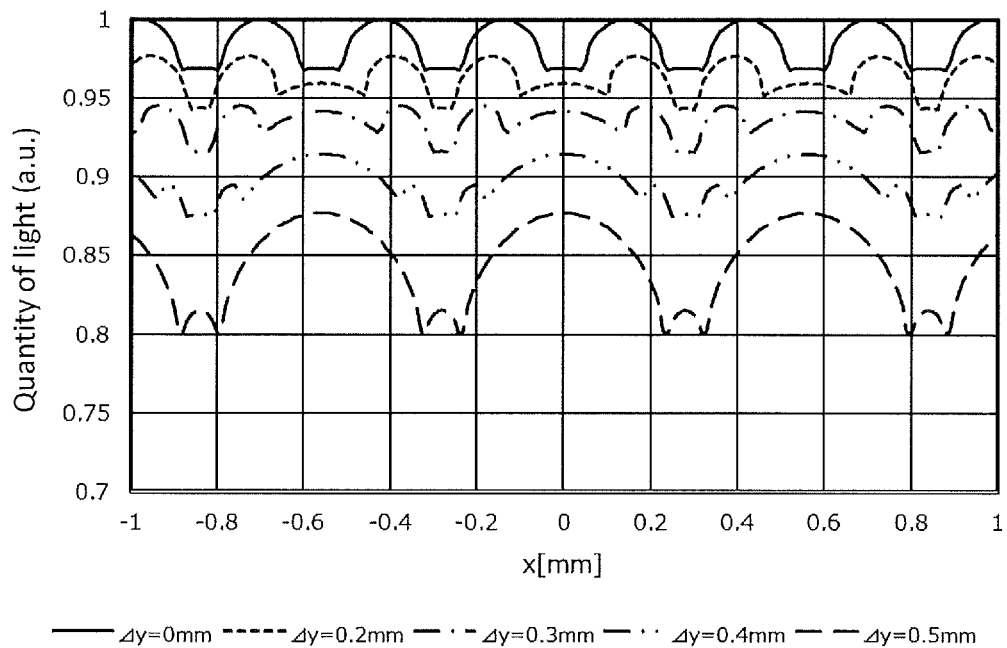
FIG. 17 is a graph showing the light quantity distribution of a rod lens array according to Example 1.
Figure 18:
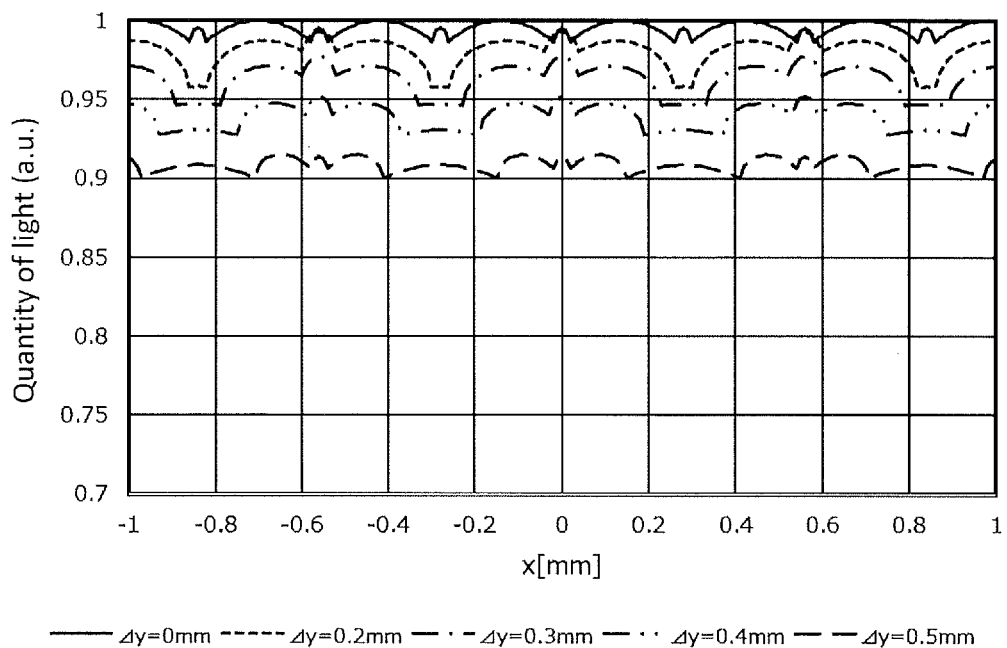
FIG. 18 is a graph showing the light quantity distribution of a rod lens array according to Example 2.
Figure 19:
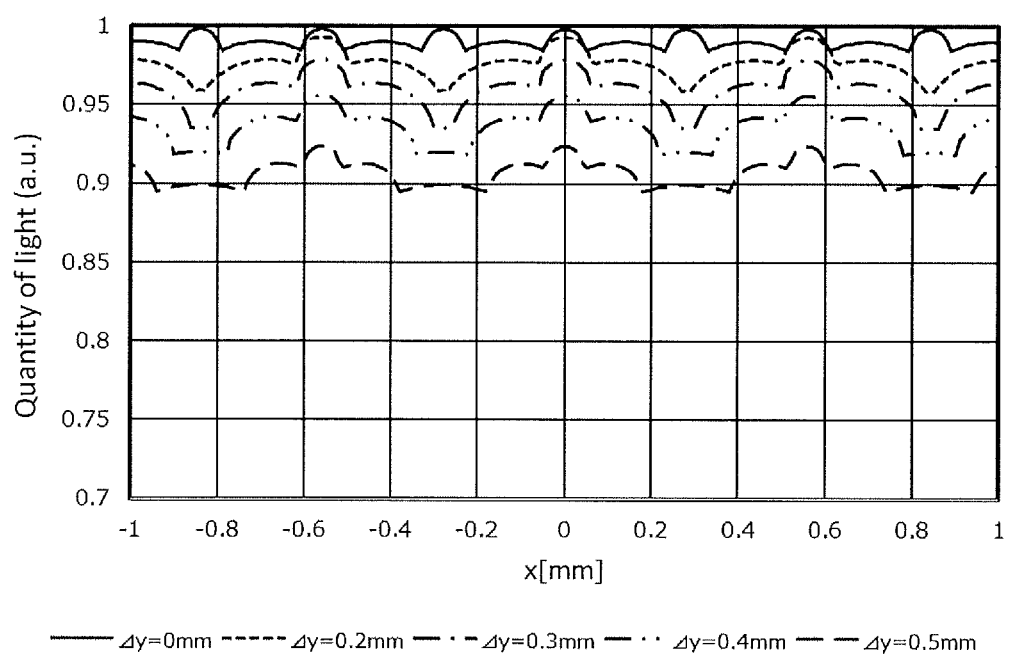
FIG. 19 is a graph showing the light quantity distribution of a rod lens array according to Example 3.

FIGS. 17, 18, and 19 respectively show, for the rod lens arrays according to Examples 1, 2, and 3, the light quantity distribution determined along the reference line of the unevenness of quantity of light.

(Depth of Unevenness of Quantity of Light)

In a similar manner to the calculation of the unevenness of quantity of light, the unevenness of quantity of light was determined for a plurality of sets of $\Delta L$ and y in the rod lens arrays according to Examples 1 to 3 and Comparative Example 4 on the basis of the optical system shown in FIGS. 16A and 16B. The results are shown in Tables 5 and 6. The maximum value of the unevenness of quantity of light $\Delta E$ for a predetermined domain of $\Delta L$ and y is the depth of the unevenness of quantity of light $\Delta E_{(y,\Delta L)}$. The optical parameters of the rod lens array according to Comparative Example 4 are as follows.

Refractive index no at the center=1.450
Optical constant $\sqrt{A}$=0.1500 mm$^{-1}$
Lens length $Z_0$=27.75 mm
Document or the like—lens distance $L_0$=8.211 mm
Radius of field of view $X_0$=0.8187 mm
Overlapping degree M=0.9097

For the domains of −1.5 mm≤$\Delta L$≤1.5 mm and 0≤y≤0.5 mm, the rod lens array according to Example 1 had a depth of an unevenness of quantity of light $\Delta E_{(y,\Delta L)}$ of 13.2%, the rod lens array according to Example 2 had a depth of an unevenness of quantity of light $\Delta E_{(y,\Delta L)}$ of 6.4%, the rod lens array according to Example 3 had a depth of an unevenness of quantity of light $\Delta E_{(y,\Delta L)}$ of 6.0%, and the rod lens array according to Comparative Example 4 had a depth of an unevenness of quantity of light $\Delta E_{(y,\Delta L)}$ of 120.8%.

For the domains of −1.0 mm≤$\Delta L$≤1.0 mm and 0≤y≤0.3 mm, the rod lens array according to Example 1 had a depth of an unevenness of quantity of light $\Delta E_{(y,\Delta L)}$ of 7.5%, the rod lens array according to Example 2 had a depth of an unevenness of quantity of light $\Delta E_{(y,\Delta L)}$ of 5.4%, the rod lens array according to Example 3 had a depth of an unevenness of quantity of light $\Delta E_{(y,\Delta L)}$ of 4.8%, and the rod lens array according to Comparative Example 4 had a depth of an unevenness of quantity of light $\Delta E_{(y,\Delta L)}$ of 120.8%.

For the domains of $-0.5 \text{ mm} \leq \Delta L \leq 0.5 \text{ mm}$ and $0 \leq y \leq 0.2 \text{ mm}$, the rod lens array according to Example 1 had a depth of an unevenness of quantity of light $\Delta E_{(y,\Delta L)}$ of 4.3%, the rod lens array according to Example 2 had a depth of an unevenness of quantity of light $\Delta E_{(y,\Delta L)}$ of 3.6%, the rod lens array according to Example 3 had a depth of an unevenness of quantity of light $\Delta E_{(y,\Delta)}$ of 3.6%, and the rod lens array according to Comparative Example 4 had a depth of an unevenness of quantity of light $\Delta E_{(y,\Delta L)}$ of 57.7%.

TABLE 1

| | $SiO_2$ | $TiO_2$ | $B_2O_3$ | MgO | ZnO | SrO | BaO | $Li_2O$ | $Na_2O$ | $K_2O$ | $Cs_2O$ | $ZrO_2$ | $Sb_2O_3$ |
|---|---|---|---|---|---|---|---|---|---|---|---|---|---|
| Example 1 | 52.7 | 4.0 | 3.0 | 8.0 | 6.0 | 4.0 | 4.0 | 1.0 | 16.9 | 0.0 | 0.0 | 0.5 | 0.1 |
| Example 2 | 52.7 | 4.0 | 3.0 | 8.0 | 6.0 | 4.0 | 4.0 | 2.0 | 15.9 | 0.0 | 0.0 | 0.5 | 0.1 |
| Example 3 | 48.7 | 4.0 | 3.0 | 8.0 | 6.0 | 4.0 | 4.0 | 2.0 | 19.9 | 0.0 | 0.0 | 0.5 | 0.1 |
| Example 4 | 55.7 | 4.0 | 0.0 | 8.0 | 6.0 | 4.0 | 4.0 | 1.0 | 16.9 | 0.0 | 0.0 | 0.5 | 0.1 |
| Comparative Example 1 | 52.7 | 4.0 | 3.0 | 8.0 | 6.0 | 4.0 | 4.0 | 4.0 | 13.9 | 0.0 | 0.0 | 0.5 | 0.1 |
| Comparative Example 2 | 52.7 | 4.0 | 4.5 | 10.9 | 8.0 | 4.0 | 4.0 | 4.0 | 7.5 | 0.0 | 0.0 | 0.5 | 0.1 |
| Comparative Example 3 | 52.7 | 4.0 | 3.0 | 8.0 | 6.0 | 4.0 | 4.0 | 9.9 | 8.0 | 0.0 | 0.0 | 0.5 | 0.1 |
| Reference Example 1 | 61.4 | 0.0 | 0.0 | 0.0 | 14.6 | 0.0 | 0.0 | 0.0 | 0.0 | 22.6 | 0.8 | 0.5 | 0.1 |

TABLE 2

| | MgO + ZnO | ZnO/(ZnO + MgO) | $Li_2O$ + $Na_2O$ | $Li_2O$/$Na_2O$ | $SiO_2$ + $B_2O_3$ + $TiO_2$ |
|---|---|---|---|---|---|
| Example 1 | 13.9 | 0.4 | 17.9 | 0.1 | 59.6 |
| Example 2 | 13.9 | 0.4 | 17.9 | 0.1 | 59.6 |
| Example 3 | 13.9 | 0.4 | 21.9 | 0.1 | 55.7 |
| Example 4 | 13.9 | 0.4 | 17.9 | 0.1 | 59.6 |
| Comparative Example 1 | 13.9 | 0.4 | 17.9 | 0.3 | 59.6 |
| Comparative Example 2 | 18.9 | 0.4 | 11.4 | 0.5 | 61.1 |
| Comparative Example 3 | 13.9 | 0.4 | 17.9 | 1.3 | 59.7 |
| Reference Example 1 | 14.6 | 1.0 | 0.0 | — | 61.4 |

TABLE 3

| | Aperture angle θ [°] | Refractive index $n_0$ | Lens diameter D [mm] | Refractive-index distribution constant $\sqrt{A}$ [$mm^{-1}$] | Lens length Z [mm] | Lens imaging distance TC [mm] | Lens-imaging position distance $L_i$ [mm] | Maximum value of MTF [%] | DOF [mm] | Radius of field of view $X_0$ [mm] | Overlapping degree M | Water resistance |
|---|---|---|---|---|---|---|---|---|---|---|---|---|
| Example 1 | 3.80 | 1.600 | 0.560 | 0.148 | 24.0 | 64.5 | 20.3 | 76.7 | 2.5 | 1.37 | 2.45 | Class 1 |
| Example 2 | 5.21 | 1.600 | 0.560 | 0.203 | 17.1 | 54.3 | 18.6 | 74.6 | 1.9 | 1.72 | 3.06 | Class 1 |
| Example 3 | 4.89 | 1.600 | 0.560 | 0.190 | 18.2 | 58.5 | 20.1 | 73.1 | 2.0 | 1.74 | 3.11 | Class 1 |
| Example 4 | 3.72 | 1.600 | 0.560 | 0.145 | 24.5 | 66.1 | 20.8 | 76.6 | 2.5 | 1.38 | 2.46 | Class 1 |
| Comparative Example 1 | 7.31 | 1.600 | 0.560 | 0.285 | 12.5 | 33.2 | 10.4 | 77.1 | 1.4 | 1.35 | 2.41 | Class 1 |
| Comparative Example 2 | 8.42 | 1.600 | 0.560 | 0.328 | 10.6 | 33.2 | 11.3 | 71.2 | 1.3 | 1.68 | 3.00 | Class 1 |
| Comparative Example 3 | 10.8 | 1.600 | 0.560 | 0.421 | 8.40 | 23.3 | 7.50 | 75.6 | 1.1 | 1.44 | 2.56 | Class 1 |
| Reference Example 1 | 3.90 | 1.600 | 0.560 | 0.151 | 23.5 | 64.2 | 76.1 | 76.1 | 2.4 | 1.40 | 2.51 | Class 4 |

TABLE 4

| Overlapping | | y [mm] | | | | | | | | | |
|---|---|---|---|---|---|---|---|---|---|---|---|
| | degree M | 0 | 0.05 | 0.1 | 0.15 | 0.2 | 0.25 | 0.3 | 0.35 | 0.4 | 0.45 | 0.5 |
| Example 1 | 2.45 | 3.3% | 3.5% | 3.5% | 3.6% | 3.5% | 3.4% | 3.2% | 3.7% | 4.6% | 6.3% | 9.7% |
| Example 2 | 3.06 | 1.4% | 1.9% | 3.2% | 3.7% | 3.6% | 3.5% | 3.3% | 3.0% | 2.7% | 2.2% | 1.7% |
| Example 3 | 3.11 | 1.4% | 1.8% | 2.3% | 2.8% | 3.6% | 4.8% | 4.6% | 4.4% | 4.1% | 3.7% | 3.2% |
| Example 4 | 2.46 | 3.5% | 3.6% | 3.7% | 3.7% | 3.7% | 3.6% | 3.5% | 3.4% | 4.4% | 5.7% | 8.8% |
| Comparative Example 1 | 2.41 | 2.9% | 2.9% | 2.9% | 3.0% | 2.8% | 2.7% | 3.4% | 4.6% | 6.1% | 9.0% | 11.4% |
| Comparative Example 2 | 3.00 | 3.1% | 3.2% | 3.3% | 3.3% | 2.5% | 2.4% | 2.3% | 3.1% | 2.9% | 2.7% | 3.1% |
| Comparative Example 3 | 2.56 | 1.8% | 2.6% | 4.6% | 4.7% | 4.6% | 4.5% | 4.2% | 3.7% | 3.1% | 2.5% | 2.3% |
| Reference Example 1 | 2.51 | 4.1% | 4.2% | 4.3% | 3.5% | 3.2% | 2.9% | 2.6% | 3.6% | 3.8% | 4.6% | 5.8% |

TABLE 5

| | Overlapping | ΔL | y [mm] | | | | | | | | | | | |
|---|---|---|---|---|---|---|---|---|---|---|---|---|---|---|
| | degree M | [mm] | 0 | 0.05 | 0.1 | 0.15 | 0.2 | 0.25 | 0.3 | 0.35 | 0.4 | 0.5 | 0.55 | 0.6 |
| Example 1 | 2.22 | −2.0 | 4.2% | 4.7% | 5.2% | 5.8% | 6.4% | 7.5% | 11.9% | 11.3% | 10.6% | 9.9% | 9.2% | 8.4% |
| | 2.28 | −1.5 | 5.0% | 5.3% | 5.7% | 6.0% | 6.4% | 7.0% | 7.8% | 10.0% | 12.4% | 11.6% | 10.9% | 10.2% |
| | 2.34 | −1.0 | 1.6% | 1.9% | 2.6% | 3.1% | 4.2% | 6.3% | 7.5% | 8.1% | 9.7% | 13.2% | 12.4% | 11.6% |
| | 2.39 | −0.5 | 2.6% | 2.6% | 2.6% | 2.6% | 2.5% | 3.0% | 4.1% | 5.4% | 8.4% | 9.6% | 13.9% | 13.1% |
| | 2.45 | 0 | 3.3% | 3.5% | 3.5% | 3.6% | 3.5% | 3.4% | 3.2% | 3.7% | 4.6% | 6.3% | 9.7% | 13.4% |
| | 2.51 | 0.5 | 4.1% | 4.2% | 4.3% | 3.5% | 3.2% | 2.9% | 2.6% | 3.1% | 3.8% | 4.6% | 5.8% | 7.9% |
| | 2.57 | 1.0 | 1.8% | 2.5% | 4.8% | 4.9% | 4.8% | 4.6% | 4.3% | 4.0% | 3.4% | 2.8% | 2.0% | 3.7% |
| | 2.63 | 1.5 | 2.1% | 2.5% | 3.3% | 4.1% | 5.5% | 6.7% | 6.4% | 6.0% | 5.5% | 5.1% | 4.5% | 3.8% |
| | 2.68 | 2.0 | 2.7% | 3.1% | 3.4% | 3.8% | 4.4% | 5.2% | 6.9% | 7.6% | 7.2% | 6.7% | 6.2% | 5.6% |
| Example 2 | 2.74 | −2.0 | 3.4% | 3.6% | 3.9% | 4.1% | 4.3% | 4.7% | 5.2% | 6.1% | 8.6% | 8.1% | 7.6% | 7.1% |
| | 2.82 | −1.5 | 1.2% | 1.6% | 1.8% | 2.3% | 3.0% | 4.0% | 5.1% | 5.3% | 5.8% | 6.4% | 9.3% | 8.8% |
| | 2.90 | −1.0 | 2.1% | 2.1% | 2.2% | 2.1% | 2.1% | 2.0% | 2.1% | 2.6% | 3.5% | 5.0% | 6.3% | 7.4% |
| | 2.98 | −0.5 | 2.9% | 3.0% | 3.0% | 3.1% | 3.1% | 3.0% | 2.9% | 2.8% | 2.6% | 2.7% | 3.3% | 4.3% |
| | 3.06 | 0.0 | 1.4% | 1.9% | 3.2% | 3.7% | 3.6% | 3.5% | 3.3% | 3.0% | 2.7% | 2.2% | 1.7% | 1.4% |
| | 3.14 | 0.5 | 1.7% | 2.1% | 2.4% | 2.7% | 3.1% | 4.0% | 5.4% | 5.2% | 4.9% | 4.5% | 4.1% | 3.6% |
| | 3.22 | 1.0 | 2.5% | 2.6% | 2.8% | 3.0% | 3.2% | 3.4% | 3.6% | 4.1% | 5.0% | 6.2% | 5.8% | 5.4% |
| | 3.30 | 1.5 | 1.3% | 1.6% | 1.7% | 2.1% | 2.7% | 3.6% | 3.7% | 3.8% | 4.1% | 4.4% | 5.1% | 6.8% |
| | 3.38 | 2.0 | 1.5% | 1.5% | 1.6% | 1.5% | 1.5% | 1.4% | 1.5% | 1.9% | 2.5% | 3.2% | 4.4% | 4.7% |

TABLE 6

| | Overlapping | ΔL | y [mm] | | | | | | | | | | | |
|---|---|---|---|---|---|---|---|---|---|---|---|---|---|---|
| | degree M | [mm] | 0 | 0.05 | 0.1 | 0.15 | 0.2 | 0.25 | 0.3 | 0.35 | 0.4 | 0.5 | 0.55 | 0.6 |
| Example 3 | 2.81 | −2.0 | 1.6% | 1.8% | 2.3% | 2.8% | 4.0% | 4.8% | 5.0% | 5.4% | 5.9% | 6.8% | 9.1% | 8.5% |
| | 2.88 | −1.5 | 1.9% | 1.9% | 2.0% | 1.9% | 1.8% | 1.9% | 2.4% | 3.0% | 4.3% | 6.0% | 6.5% | 8.0% |
| | 2.96 | −1.0 | 2.7% | 2.7% | 2.8% | 2.8% | 2.8% | 2.7% | 2.6% | 2.5% | 2.5% | 3.0% | 3.9% | 5.6% |
| | 3.03 | −0.5 | 2.4% | 3.3% | 3.1% | 3.0% | 2.8% | 2.6% | 2.4% | 2.1% | 1.9% | 1.6% | 2.9% | 3.4% |
| | 3.11 | 0.0 | 1.4% | 1.8% | 2.3% | 2.8% | 3.6% | 4.8% | 4.6% | 4.4% | 4.1% | 3.7% | 3.2% | 2.6% |
| | 3.18 | 0.5 | 2.1% | 2.4% | 2.6% | 2.9% | 3.1% | 3.4% | 4.0% | 5.0% | 5.8% | 5.4% | 5.0% | 4.6% |
| | 3.26 | 1.0 | 2.8% | 2.9% | 3.1% | 3.2% | 3.3% | 3.5% | 3.6% | 3.9% | 4.4% | 5.2% | 6.5% | 6.1% |
| | 3.33 | 1.5 | 1.0% | 1.1% | 1.0% | 1.3% | 1.6% | 2.0% | 2.5% | 3.6% | 4.0% | 4.3% | 4.6% | 5.3% |
| | 3.41 | 2.0 | 1.7% | 1.8% | 1.8% | 1.8% | 1.8% | 1.7% | 1.6% | 1.6% | 1.9% | 2.5% | 3.2% | 4.7% |
| Comparative Example 4 | 0.75 | −2.0 | 22.1% | 37.4% | 66.3% | 103.8% | 96.8% | 90.4% | 57.2% | 57.1% | 57.7% | 56.6% | 55.8% | |
| | 0.79 | −1.5 | 25.5% | 34.4% | 46.1% | 81.7% | 108.2% | 100.0% | 82.9% | 60.1% | 60.2% | 59.9% | 59.7% | 59.1% |
| | 0.83 | −1.0 | 29.1% | 34.5% | 41.4% | 52.8% | 90.0% | 110.5% | 101.1% | 73.5% | 62.6% | 62.3% | 62.1% | 61.5% |
| | 0.87 | −0.5 | 23.0% | 29.1% | 40.6% | 46.7% | 57.7% | 120.4% | 111.3% | 97.5% | 65.1% | 65.2% | 64.6% | 64.1% |
| | 0.91 | 0.0 | 8.8% | 10.9% | 16.0% | 22.8% | 36.5% | 61.5% | 120.8% | 110.9% | 94.4% | 67.7% | 67.2% | 66.7% |
| | 0.95 | 0.5 | 11.8% | 13.0% | 13.8% | 14.7% | 21.3% | 31.3% | 51.8% | 120.7% | 109.3% | 90.2% | 70.0% | 69.3% |
| | 1.00 | 1.0 | 14.6% | 15.8% | 16.9% | 17.7% | 18.5% | 22.4% | 32.2% | 51.6% | 120.1% | 107.6% | 84.0% | 72.0% |
| | 1.04 | 1.5 | 16.9% | 18.1% | 19.4% | 12.5% | 11.0% | 9.1% | 9.6% | 14.6% | 30.9% | 55.3% | 52.7% | 31.5% |
| | 1.08 | 2.0 | 19.0% | 17.6% | 16.1% | 16.6% | 17.7% | 18.2% | 18.6% | 18.6% | 19.0% | 21.9% | 33.8% | 35.5% |

The invention claimed is:

1. A rod lens array forming an erecting equal-magnification image, the rod lens array comprising:
a plurality of gradient-index rod lenses arrayed to have optical axes parallel to each other,
the plurality of gradient-index rod lenses each having a refractive-index distribution in a radial direction thereof, the refractive-index distribution n(r) approximated by $n(r)=n_0 \cdot \{1-(A/2) \cdot r^2\}$, where a refractive index at a center of the gradient-index rod lens is represented by no, a refractive-index distribution constant of the gradient-index rod lens is represented by $\sqrt{A}$, and a distance from the center of the gradient-index rod lens is represented by r, the plurality of gradient-index rod lenses each having an aperture angle θ of 3 to 6°, the aperture angle θ represented by $\theta=\sin^{-1}(n_0 \cdot \sqrt{A} \cdot r_0)$, where a radius of the gradient-index rod lens is represented by $r_0$, the rod lens array having an imaging distance of 45 to 75 mm and a depth of field of 1.5 to 3.0 mm with value of modulation transfer function (MTF) of 30% or more at a spatial frequency of 6 lp/mm.

2. The rod lens array according to claim 1, wherein
the refractive-index distribution constant $\sqrt{A}$ is 0.130 to 0.230 mm$^{-1}$, and
the refractive index no at the center is 1.51 to 1.65.

3. The rod lens array according to claim 1, further having a maximum value of the MTF of 60% or more.

4. The rod lens array according to claim 1, having a maximum value of the MTF at a first lens-imaging position distance of 13 to 28 mm.

5. The rod lens array according to claim 1, further having an overlapping degree M represented by $M=X_0/2R$ of 1.4 to 3.6,
where an array pitch of the rod lens array is represented by 2R, and a radius of field of view is represented by $X_0$.

6. The rod lens array according to claim 1, wherein a glass composition at the center of the gradient-index rod lens satisfies the following requirements, in mol %:
40%≤$SiO_2$≤65%;
0%≤$TiO_2$≤10%;
0.1%≤MgO≤22%;
0.15%≤ZnO≤15%;
0.5%≤$Li_2O$<4%;
2%≤$Na_2O$≤20%;
0%≤$B_2O_3$≤20%;
0%≤$Al_2O_3$≤10%; and
0%≤$K_2O$≤3%.

7. An optical device comprising the rod lens array according to claim 1.

8. An image sensor comprising:
the rod lens array according to claim 1;
a linear illuminator configured to linearly illuminate an object; and
a linear optical sensor disposed such that light reflected from the object is collected through the rod lens array.

9. The image sensor according to claim 8, wherein
the linear optical sensor has a plurality of segments each including respective color filters corresponding to R, G, and B arrayed in a sub-scanning direction of the rod lens array, and
the plurality of segments are arrayed in a main-scanning direction of the rod lens array.

10. A printer comprising a write head having the rod lens array according to claim 1.

11. An inspection apparatus comprising:
a conveyor for conveying an article;
an illuminator for illuminating the article;
an image sensor; and
a controller, wherein
the image sensor includes the rod lens array according to claim 1 for collecting light reflected from the article,
the image sensor acquires image information of the article conveyed by the conveyor, and transmits the image information to the controller, and
on the basis of the image information, the controller is capable of specifying a defect of the article to determine whether the article is defective.

12. The rod lens array according to claim 1, further having an unevenness of quantity of light $\Delta E_{(y,\Delta L)}$, the unevenness of quantity of light $\Delta E_{(y,\Delta L)}$ calculated on basis of a maximum quantity of light and a minimum quantity of light in the range specified parameters of y and ΔL,
where y is a shift of a sub-scanning direction from a reference line $L_R$, the reference line $L_R$ is a line of an intersection between a first erecting equal-magnification image plane and a first plane, the first plane is a plane equidistant in the sub-scanning direction from one virtual end line and the other virtual end line of the rod lens in an end surface of the gradient-index rod lens viewed along a direction parallel to a central axis of the gradient-index rod lens,
and where ΔL is a shift of the axis direction from an object plane P, the object plane P is an object plane with a maximum MTF of the gradient-index rod lens array provided in an erecting equal-magnification system,
the rod lens array having a first unevenness of quantity of light $\Delta E_{(0,0)}$ of 6% or less, where y=ΔL=0.

13. The rod lens array according to claim 12, the rod lens array having a second unevenness of quantity of light $\Delta E_{(y,0)}$ of 12% or less, where a first range of y is 0 to 0.5 mm, and ΔL=0.

14. The rod lens array according to claim 12, the rod lens array having a third unevenness of quantity of light $\Delta E_{(y,\Delta L)}$ of 25% or less, where a first range of y is 0 to 0.5 mm, and a second range of ΔL is −1.5 to 1.5 mm.

* * * * *